United States Patent
Imagawa et al.

(10) Patent No.: US 8,094,717 B2
(45) Date of Patent: *Jan. 10, 2012

(54) IMAGE GENERATION APPARATUS AND IMAGE GENERATION METHOD

(75) Inventors: Taro Imagawa, Osaka (JP); Kunio Nobori, Osaka (JP); Takeo Azuma, Kyoto (JP)

(73) Assignee: Panasonic Corporation, Osaka (JP)

( * ) Notice: Subject to any disclaimer, the term of this patent is extended or adjusted under 35 U.S.C. 154(b) by 848 days.

This patent is subject to a terminal disclaimer.

(21) Appl. No.: 12/094,387

(22) PCT Filed: Oct. 11, 2007

(86) PCT No.: PCT/JP2007/069821
§ 371 (c)(1),
(2), (4) Date: May 20, 2008

(87) PCT Pub. No.: WO2008/047664
PCT Pub. Date: Apr. 24, 2008

(65) Prior Publication Data
US 2009/0263044 A1  Oct. 22, 2009

(30) Foreign Application Priority Data

Oct. 19, 2006 (JP) ................................. 2006-285481

(51) Int. Cl.
*H04N 7/12* (2006.01)
*G06K 9/36* (2006.01)
(52) U.S. Cl. .................................. 375/240.03; 382/236
(58) Field of Classification Search ........................ None
See application file for complete search history.

(56) References Cited

U.S. PATENT DOCUMENTS 7,596,177 B2 * 9/2009 Imagawa et al. ......... 375/240.03
(Continued)

FOREIGN PATENT DOCUMENTS

JP       11-234644       8/1999
(Continued)

OTHER PUBLICATIONS

Guo et al., "Spatial Resolution Enhancement of Video Using Still Images", Computer Science Department, University of Wisconsin-Madison. Apr. 2, 2004. all pages.*

(Continued)

*Primary Examiner* — Jason M Repko
*Assistant Examiner* — Thomas A James
(74) *Attorney, Agent, or Firm* — Wenderoth, Lind & Ponack, L.L.P.

(57) ABSTRACT

An image generation apparatus generates a new video sequence with a high S/N ratio and suppressed motion blurs, from an original video sequence and a still image which are generated by capturing the same dark, moving object. The image generation apparatus includes: a capture condition decision unit (105) which decides, based on an incident-light amount, capture conditions under which the original video sequence and the still image are to be captured; an image receiving unit (101) which receives the original video sequence and the still image which are generated under the capture conditions; an integration processing unit (104a) which generates, from the original video sequence and the still image, the new video sequence including frames having a resolution equal to or higher than the still image, at a frame rate equal to or higher than the original video sequence, by reducing a difference between (i) a value of the still image and (ii) a sum of values of the frames in the new video sequence which correspond to an exposure period for the still image. The capture condition decision unit (105c) decides a longer duration of an exposure period as a duration of the still image capturing, as the incident-light amount is smaller. Here, the duration is longer than an frame interval of the original video sequence.

9 Claims, 21 Drawing Sheets

U.S. PATENT DOCUMENTS

| | | | |
|---|---|---|---|
| 2005/0195899 A1* | 9/2005 | Han | 375/240.21 |
| 2005/0219642 A1* | 10/2005 | Yachida et al. | 358/448 |
| 2006/0165179 A1* | 7/2006 | Feuer et al. | 375/240.18 |
| 2007/0189386 A1 | 8/2007 | Imagawa et al. | |

FOREIGN PATENT DOCUMENTS

| | | |
|---|---|---|
| JP | 2003-259184 | 9/2003 |
| JP | 2004-40422 | 2/2004 |
| JP | 1 583 357 | 10/2005 |
| JP | 2005-318548 | 11/2005 |
| JP | 3934151 | 6/2007 |
| WO | 2006/137253 | 12/2006 |

OTHER PUBLICATIONS

Guo et al., "Spatial Resolution Enhancement of Video Using Still Images", Computer Science Department, University of Wisconsin-Madison. Apr. 2, 2004. all pages.*

International Search Report issued Nov. 20, 2007 in the International (PCT) Application of which the present application is the U.S. National Stage.

* cited by examiner

FIG. 7
(a) Two-camera system
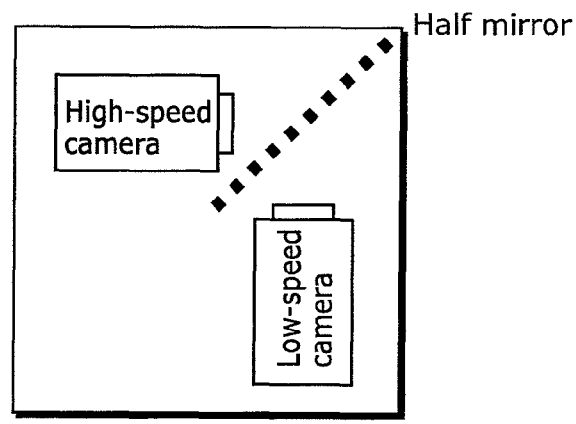
(b) Two-element system
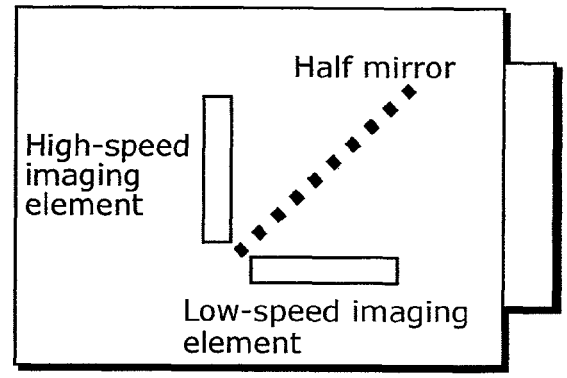
(c) One-element system
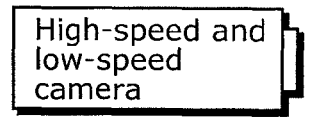

(a) High-speed and high-resolution video sequence HH(x, y, t)

(b) High-speed and low-resolution video sequence $HL(x_L, y_L, t)$ (c) Low-speed and high-resolution video sequence $LH(x, y, t_L)$ FIG. 9
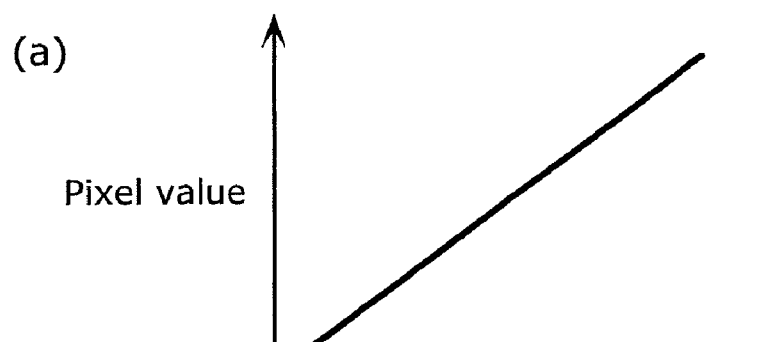
(a)
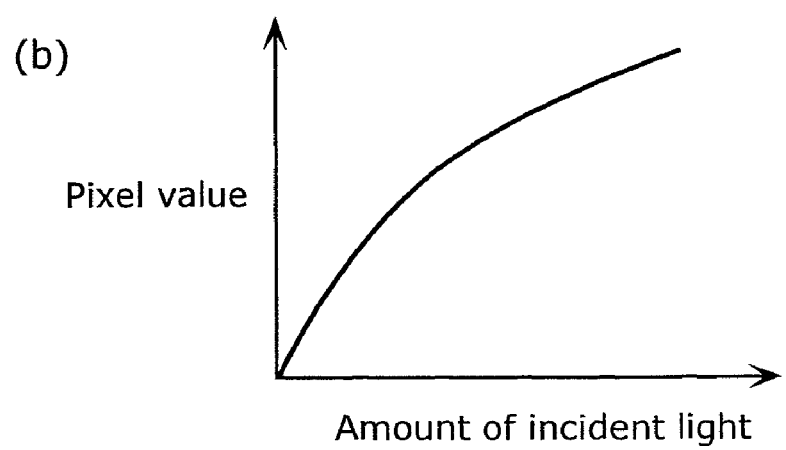
(b)
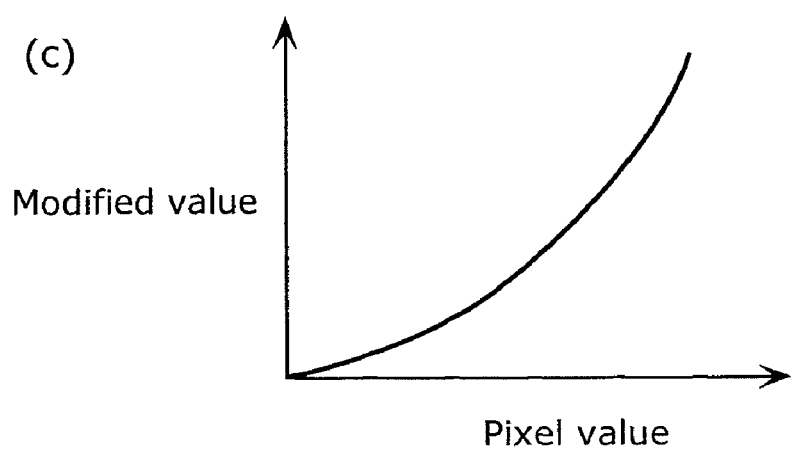
(c)

FIG. 10
(a) Frame t
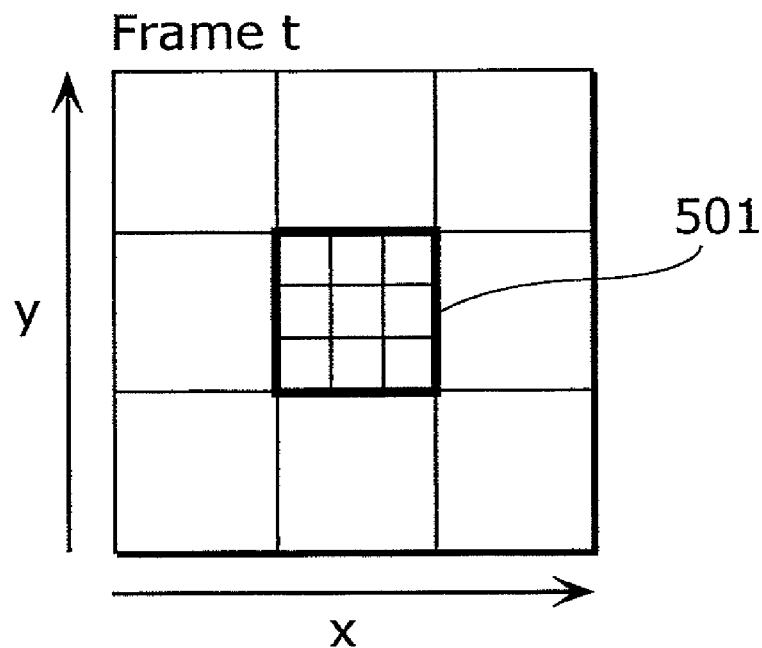
(b) Frame t+1
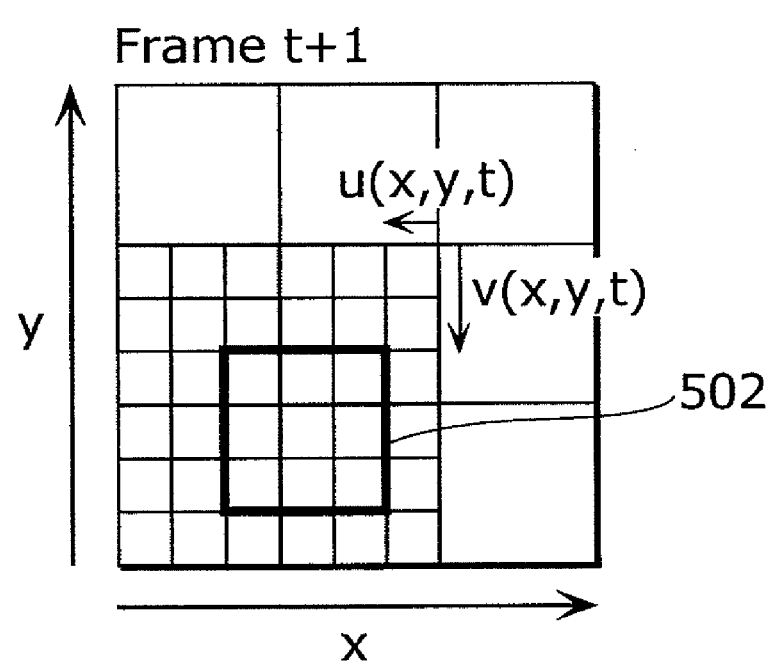

(a)

(b)

(c)

(d)

IMAGE GENERATION APPARATUS AND IMAGE GENERATION METHOD

TECHNICAL FIELD

The present invention relates to an image generation apparatus that generates a video sequence, and particularly to an image generation apparatus that generates a new video sequence which represents an object, from an original video sequence and a still image which are generated by capturing the object.

BACKGROUND ART

With the development in digital imaging devices, they have been capable of capturing images with high spatial resolution at relatively low cost. At the same time, in the aim of size reduction and low cost for cameras, an imaging element used in the cameras have been downsized. However, when an object moving in images is captured in dark environments, there is a problem of quality deterioration, which is reduction of a signal-to-noise (S/N) ratio, in capturing images having a high spatial resolution.

This problem is caused by the following reason. Since the number of pixels in an imaging element is increased or a size of the imaging element itself is reduced, a light-receiving area of each pixel is reduced. Thereby, the amount of received light is inadequate, which causes noises and eventually deteriorates image quality. Even if electrical signal amplification is performed after receiving light, noises are also amplified together. As a result, a S/N ratio is not improved.

Moreover, if an exposure period is extended to increase the amount of received light, motion blur is caused due to motion of an object. Therefore, clear images are not obtained. Furthermore, in order to increase the amount of received light, it has been also considered to enlarge an optical system such as a lens to increase an amount of collected light. This causes, however, a problem of increasing a size of an overall camera and eventually increasing a cost.

Among conventional apparatuses which generate dark and moving images, there is disclosed a technology of performing capturing a plurality of times (refer to Patent Reference 1, for example). FIG. 1 is a flowchart of processing performed by a conventional image generation apparatus according to Patent Reference 1.

As shown in FIG. 1, in Step 2201, test capturing is performed. Thereby, a direction and a magnitude of motion of an object are determined to decide how many times divided capturing processes are to be performed. In Step 2202, capturing processes are performed the decided times. In Step 2203, based on motion vector information, specific regions in respective captured frame images are shifted to average values of the frame images. Thereby, an eventual captured image is generated.

[Patent Reference 1] Japanese Unexamined Patent Application No. 2003-259184

DISCLOSURE OF INVENTION

Problems that Invention is to Solve

However, in the structure of the above conventional technology, if a plurality of objects move differently in images, even if an image frame is shifted to perform the averaging, there is still a problem of motion blur due to the objects. Moreover, when an object is dark, exposure periods for two images to be added together are to be extended. However, if the object moves fast, the extended exposure periods result in motion blur. Therefore, there is another problem that motion blur is not eliminated even if positioning is performed in all images and thereby averaging of values of the images is performed. On the other hand, if an exposure period is shortened, there is another problem of difficulty in capturing an object in each image.

In order to solve the above conventional problems, an aim of the present invention is to provide an image generation apparatus which generates a video sequence with a high S/N ratio and less motion blur, even if the video sequence has a plurality of objects which move differently in dark environment.

Means to Solve the Problems

In accordance with an aspect of the present invention for achieving the above object, an image generation apparatus that generates a new video sequence representing an object, from an original video sequence and a still image which are generated by capturing the object, the image generation apparatus includes: an image receiving unit operable to receive the original video sequence and the still image; and an image integration unit operable to generate, from the original video sequence and the still image received by the image receiving unit, the new video sequence including frames having a resolution which is equal to or higher than a resolution of the still image, at a frame rate which is equal to or higher than a frame rate of the original video sequence, by reducing a difference between (i) a value of the still image and (ii) a sum of values of the frames in the new video sequence which correspond to an exposure period for the still image, wherein the original video sequence includes frames having a resolution which is lower than the resolution of the still image and a frame interval which is shorter than the exposure period for the still image.

With this structure, frames of the new video sequence are generated so as to decrease discrepancy between the frames and the still image. Each frame in the original video sequence which is captured in an exposure period having a short duration has advantages of less motion blur. On the other hand, the still image which is captured in an exposure period having a long duration has advantages of including spatially and temporally more information regarding the object, in comparison with one frame in the original video sequence. The image generation apparatus according to the invention can generate the new video sequence having both of the above advantages.

The image generation apparatus according to the present invention may further include a capture condition decision unit operable to (i) measure an amount of light incident from the object, and (ii) decide, based on the amount of the light, at least one of (ii-1) a capture condition under which the original video sequence is to be captured and (ii-2) a capture condition under which the still image is to be captured, wherein the image receiving unit is operable to receive the original video sequence and the still image which are generated by capturing the object, under the at least one of the capture conditions decided by the capture condition decision unit, and the capture condition decision unit is operable to decide a larger area in an imaging element as an area to be used to capture one pixel of the original video sequence, as the amount of the light measured by the capture condition decision unit is smaller; or to decide a longer duration of an exposure period as a duration in which the still image is to be captured, as the amount of the light measured by the capture condition decision unit is smaller.

With this structure, the original video sequence is captured by an imaging element having a larger area for one pixel, as an amount of light incident from the object is smaller. Thereby, the image generation apparatus according to the present invention can suppress noises which become more noticeable in reduced light amount when a duration of an exposure period is short. In addition, the still image is captured in an exposure period having a longer duration, as an amount of light incident from the object is smaller. Thereby, the image generation apparatus according to the present invention can suppress noises which become more noticeable in reduced light amount when a resolution is high. As a result, it is possible to generate the new video sequence to have a high S/N ratio.

Accordingly, the image generation apparatus of the present invention can generate the new video sequence with excellent characteristics, having a resolution equal to or higher than a resolution of the still image, a high S/N ratio, and suppressed motion blur, at a frame rate equal to or more than a frame rate of the original video sequence.

Note that it is possible to embody the present invention not only as such an image generation apparatus, but also as an image generation method, a program for causing a computer to execute the method, a computer-readable recording medium, such as a CD-ROM, on which the program is recorded, and so forth.

Effects of the Invention

The image generation apparatus according to the present invention can generate a new video sequence having a high S/N ratio and suppressed motion blur, especially when a moving object is captured in a dark environment.

BRIEF DESCRIPTION OF DRAWINGS

FIG. 7 (*a*) to (*c*) shows specific examples of an image capturing apparatus.

FIG. 9 (*a*) to (*c*) shows graphs of examples of relationship between the amount of incident light and pixel values used for obtaining modified pixel values.

FIGS. 10 (*a*) and (*b*) shows the relationship between the result of motion estimation obtained from a high-speed and low-resolution video sequence and a high-speed and high-resolution video sequence.

Figure 1:
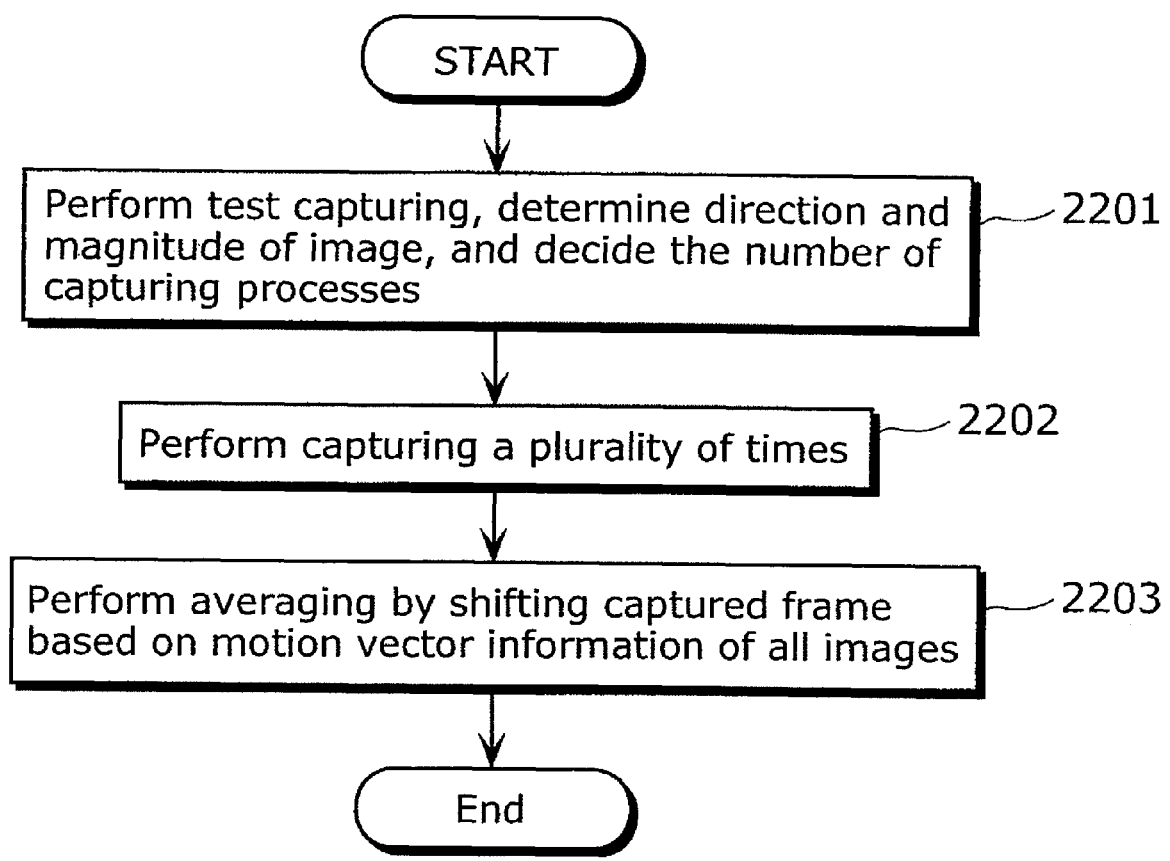
FIG. 1 is a flowchart which shows the operations of a conventional image generation apparatus.

NUMERICAL REFERENCES 10 image capturing apparatus
20 image storage apparatus
30 image generation apparatus
40 display apparatus
100 image generation system
101 image receiving unit
101*a* high-speed image receiving unit
101*b* low-speed image receiving unit
102 coding unit
103 motion estimation unit
103*a* motion distribution calculation unit
103*b* motion confidence level distribution calculation unit
103*c* sensor signal receiving unit
104 image integration unit
104*a* integration processing unit
104*b* constraint control unit
104*c* motion constraint specification unit
104*d* external model constraint unit
104*e* constraint specification unit
105 received-light amount decision unit
105*a* incident-light amount sensor
105*b* temperature sensor
105*c* capture condition decision unit
300 camera
400 display device

BEST MODE FOR CARRYING OUT THE INVENTION

An image generation apparatus according to the preferred embodiment of the present invention generates a new video sequence representing an object, from an original video sequence and a still image which are generated by capturing the object, the image generation apparatus including: an image receiving unit operable to receive the original video sequence and the still image; and an image integration unit operable to generate, from the original video sequence and the still image received by the image receiving unit, the new video sequence including frames having a resolution which is equal to or higher than a resolution of the still image, at a frame rate which is equal to or higher than a frame rate of the original video sequence, by reducing a difference between (i) a value of the still image and (ii) a sum of values of the frames in the new video sequence which correspond to an exposure period for the still image, wherein the original video sequence includes frames having a resolution which is lower than the resolution of the still image and a frame interval which is shorter than the exposure period for the still image.

The image generation apparatus may further include a capture condition decision unit operable to (i) measure an amount of light incident from the object, and (ii) decide, based on the amount of the light, at least one of (ii-1) a capture condition under which the original video sequence is to be captured and (ii-2) a capture condition under which the still image is to be captured, wherein the image receiving unit is operable to receive the original video sequence and the still image which are generated by capturing the object, under the at least one of the capture conditions decided by the capture condition decision unit, and the capture condition decision unit is operable to decide a larger area in an imaging element as an area to be used to capture one pixel of the original video sequence, as the amount of the light measured by the capture condition decision unit is smaller; or to decide a longer duration of an exposure period as a duration in which the still image is to be captured, as the amount of the light measured by the capture condition decision unit is smaller.

Here, the capture condition decision unit may further measure a temperature, and decide a larger area in the imaging element as the area to be used to capture one pixel of the original video sequence, as the temperature measured by the capture condition decision unit is higher, or decide a longer duration of the exposure period as a duration in which the still image is to be captured, as the temperature measured by the capture condition decision unit is higher.

Furthermore, it is also possible that the still image is one of frames in another video sequence, the another video sequence having a frame rate which is lower than the frame rate of the original video sequence and a resolution which is higher than the resolution of the original video sequence.

With this structure, frames of the new video sequence are generated so as to decrease discrepancy between the frames and the still image. Each frame in the original video sequence which is captured in an exposure period having a short duration has less motion blur. On the other hand, the still image which is captured in an exposure period having a long duration has a greater information amount regarding the object. The image generation apparatus according to the invention can generate the new video sequence having both of the above advantages.

The still image is captured in an exposure period having a longer duration, as an amount of light incident from the object is smaller. Or, the original video sequence is captured by an imaging element having a larger area for one pixel, as an amount of light incident from the object is smaller. Thereby, the image generation apparatus according to the present invention can efficiently suppress noises which become more noticeable when the amount of the received light is inadequate. As a result, it is possible to generate the new video sequence to have a high S/N ratio.

The still image is captured in an exposure period having a longer duration, as a temperature is higher. Or, the original video sequence is captured using an imaging element in which one pixel has a larger area, as a temperature is higher. Thereby, the image generation apparatus according to the present invention can efficiently suppress noises which become more noticeable when a temperature is higher. As a result, it is possible to generate the new video sequence to have a high S/N ratio.

Still further, the image generation apparatus may further include a constraint unit operable to specify a constraint to be satisfied by pixel values of the new video sequence to be generated, based on continuity between pixel values of spatially and temporally adjacent pixels, wherein the image integration unit is operable to generate the new video sequence in which the constraint specified by the constraint unit is satisfied.

With this structure, a new video sequence in which temporal and spatial continuity of images are maintained can be generated. Such a video sequence is suitable for photographing an object in nature which obviously shows such continuity.

Still further, the image generation apparatus may further include: a motion estimation unit operable to estimate a motion of the object from the original video sequence which is received by the image receiving unit; and a constraint unit operable to specify a constraint to be satisfied by pixel values of the new video sequence to be generated, based on the motion estimated by the motion estimation unit, wherein the image integration unit is operable to generate the new video sequence in which the constraint specified by the constraint unit is satisfied.

By doing so, the new video sequence can be generated using a motion estimation approach.

An image generation system according to the present embodiment of the present invention will be described in detail with reference to the diagrams.

Figure 2:
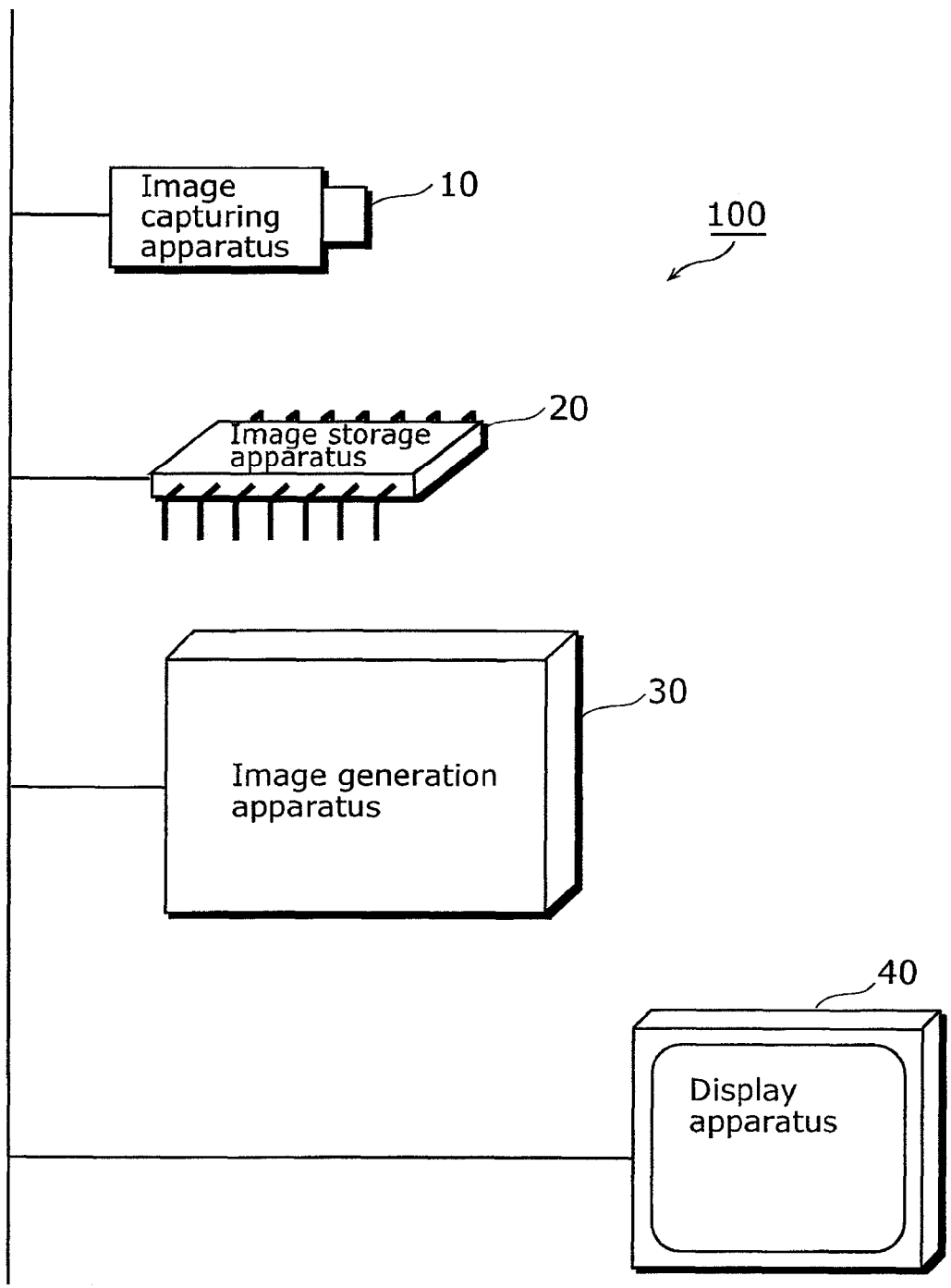
FIG. 2 is a block diagram which shows the hardware structure of the image generation system according to an embodiment of the present invention.

FIG. 2 is a block diagram which shows the hardware structure of the image generation system according to the present embodiment of the present invention.

An image generation system 100 is a system for generating a new high spatial and temporal resolution video sequence (a high-speed and high-resolution video sequence in this example) from a plurality of video sequences (a high-speed and low-resolution video sequence and a low-speed and high-resolution video sequence) showing the same object. This system includes an image capturing apparatus 10, an image storage apparatus 20, an image generation apparatus 30 and a display apparatus 40. The image capturing apparatus 10 is a camera or the like which photographs an object so as to capture two types of video sequences of different spatial and temporal resolutions (a high-speed and low-resolution video sequence and a low-speed and high-resolution video sequence). The image storage apparatus 20 is a memory or the like which temporarily stores the video sequences captured by the image capturing apparatus 10. The image generation apparatus 30 is an apparatus which reads a plurality of video sequences stored in the image storage apparatus 20 and generates a new video sequence with an increased spatial and temporal resolution from the read plurality of video sequences. The display apparatus 40 is an apparatus which displays the new video sequence generated by the image generation apparatus 30. Note that the image generation apparatus 30 may be embodied as hardware such as a dedicated circuit, or as software such as an image processing program for a general-purpose computer.

Figure 3:
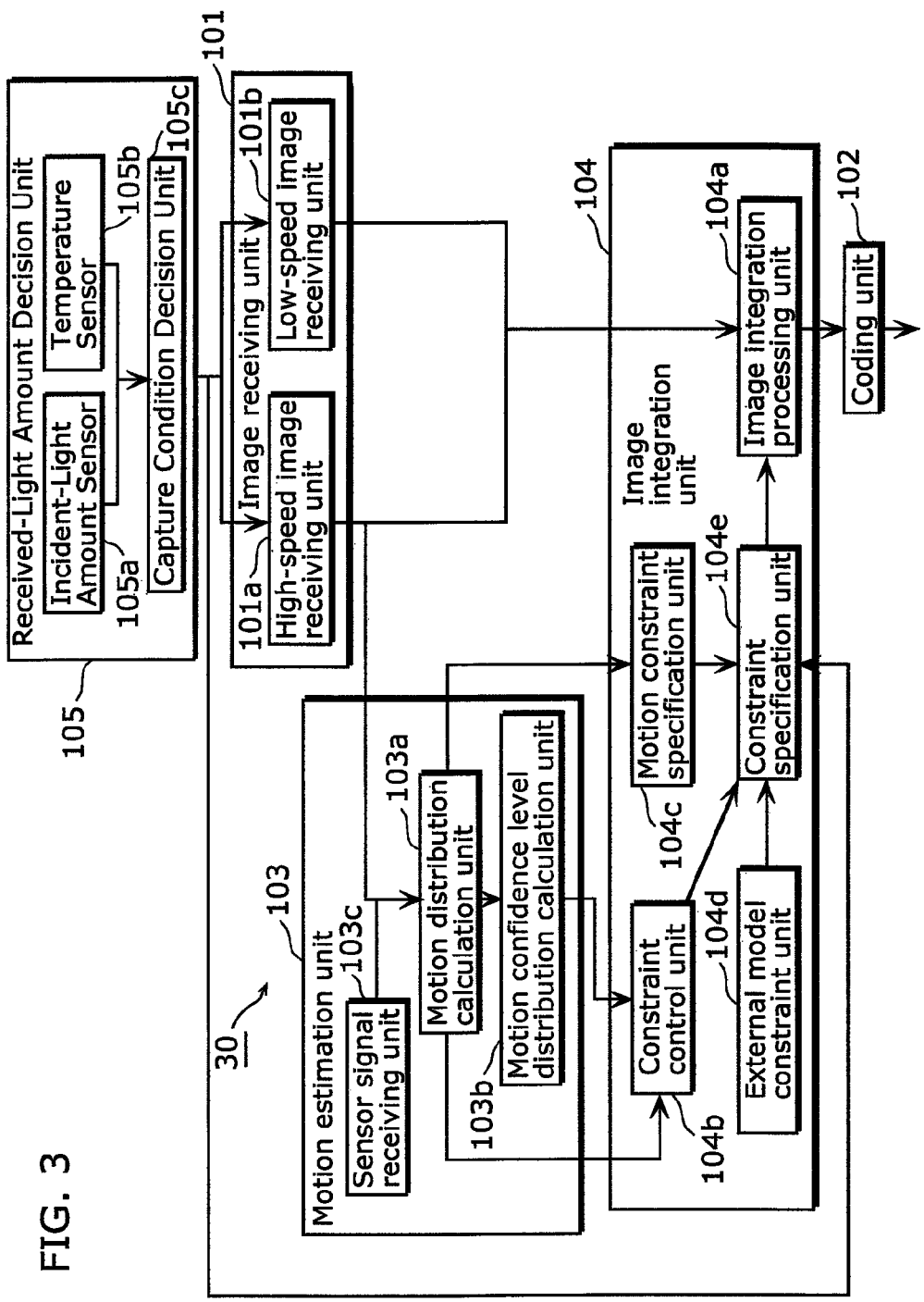
FIG. 3 is a functional block diagram which shows the structure of the image generation apparatus according to the present embodiment.

FIG. 3 is a functional block diagram which shows the internal structure of the image generation apparatus 30 in the image generation system 100 shown in FIG. 2. This image generation apparatus 30 includes an image receiving unit 101, a motion estimation unit 103, an image integration unit 104, and a received-light amount decision unit 105.

The image receiving unit 101 is an interface or the like which accepts inputted plurality of video sequences of different spatial and temporal resolutions or different spatial and temporal phases obtained by photographing the same object. The image receiving unit 101 includes a high-speed image receiving unit 101a which accepts (or acquires) an inputted video sequence (a high-speed and low-resolution video sequence) captured at a high speed (high frame rate) and with a low spatial resolution, and a low-speed image receiving unit 101b which accepts (or acquires) an inputted video sequence (a low-speed and high-resolution video sequence) captured at a low speed (low frame rate) and with a high spatial resolution. As mentioned above, both the image inputted to the high-speed image receiving unit 101a and the image inputted to the low-speed image receiving unit 101b are the images obtained by photographing the same object, although they are different in their spatial and temporal resolutions.

Here, the high-speed and low-resolution video sequence is one example of the "original video sequence" according to the aspect of the present invention, and a frame of the low-speed and high-resolution video sequence is one example of the "still image" according to the aspect of the present invention.

The motion estimation unit 103 includes: a sensor signal receiving unit 103c which acquires a signal from a motion estimation sensor in the image capturing apparatus 10 which generates images to be inputted to the image receiving unit 101 (such as an acceleration sensor included in the image capturing apparatus 10); a motion distribution calculation unit 103a which performs motion estimation of an object across the entire inputted image of each frame, based on the image inputted to the image receiving unit 101 and/or the motion signal inputted to the sensor signal receiving unit 103c; and a motion confidence level distribution calculation unit 103b which calculates the confidence level of motion estimation performed across the entire image of each frame by the motion distribution calculation unit 103a.

The image integration unit 104 is a processing unit which generates a new video sequence by integrating a plurality of video sequences, using the result of motion estimation performed by the motion estimation unit 103 for an image area with a high confidence level out of the plurality of video sequences inputted to the image receiving unit 101, while using predetermined constraints for an image area with a low confidence level out of the plurality of video sequences. The image integration unit 104 includes an integration processing unit 104a, a constraint control unit 104b, a motion constraint specification unit 104c, an external model constraint unit 104d, and a constraint specification unit 104e.

The motion constraint specification unit 104c is a processing unit which specifies, using the result of motion estimation performed by the motion distribution calculation unit 103a, the constraints (the constraints specified depending on the result of motion estimation are hereinafter referred as "motion constraints") which should be satisfied by each pixel value of a high-speed and high-resolution video sequence to be generated.

The external model constraint unit 104d specifies the constraints (the constraints specified independent of the result of motion estimation are hereinafter referred to as "external model constraints"), in addition to the result of motion estimation performed by the motion distribution calculation unit 103a, which should be satisfied by each pixel value of a high-speed and high-resolution video sequence to be generated.

The constraint control unit 104b determines, using the result of motion estimation calculated by the motion distribution calculation unit 103a and the confidence level calculated by the motion confidence level distribution calculation unit 103b, the degrees of motion constraints and external model constraints to be imposed respectively in each position in each frame image in a high-speed and high-resolution video sequence to be generated. The constraint control unit 104b also notifies the constraint specification unit 104e of the determined degrees.

The constraint specification unit 104e specifies, based on the degrees of the motion constraints and external model constraints to be imposed determined by the constraint control unit 104b, the constraints obtained by integrating the motion constraints specified by the motion constraint specification unit 104b and the external model constraints specified by the external model constraint unit 104d. That is, the constraints which should be satisfied by each pixel value of the high-speed and high-resolution video sequence to be generated.

The integration processing unit 104a integrates the high-speed video sequence inputted to the high-speed image receiving unit 101a and the low-speed video sequence inputted to the low-speed image receiving unit 101b according to the constraints specified by the constraint specification unit 104e, so as to generate a high-speed and high-resolution video sequence.

The coding unit 102 compresses and encodes the video sequence generated by the integration processing unit 104a and outputs the resulting data.

In the received-light amount decision unit 105, an incident-light amount sensor 105 measures an amount of light incident from the object (hereinafter, referred to also as "incident-light amount"), and a temperature sensor 105b measures a temperature of a light-receiving element included in an image receiving unit. Based on the measured incident-light amount and temperature, a capture condition decision unit 105c in the received-light amount decision unit 105 decides capture conditions (a duration of an exposure period, a frame rate, a pixel size) under which images received by the image receiving unit need to be captured.

Note that "frames" in the present embodiment include not only frames in progressive scan but also even fields and odd fields in interlaced scan.

Figure 4:
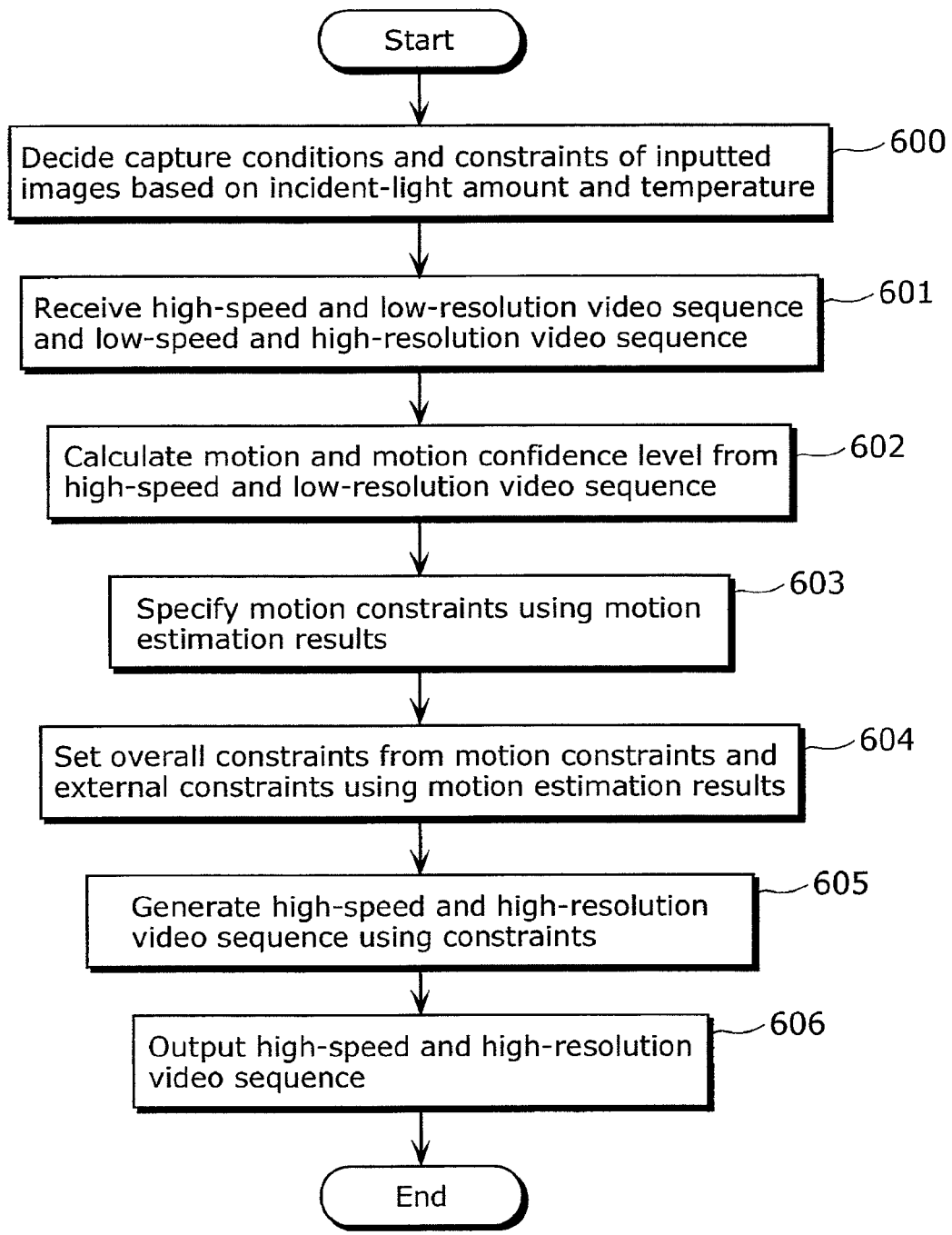
FIG. 4 is a flowchart which shows the operations of the image generation apparatus.
Figure 5:
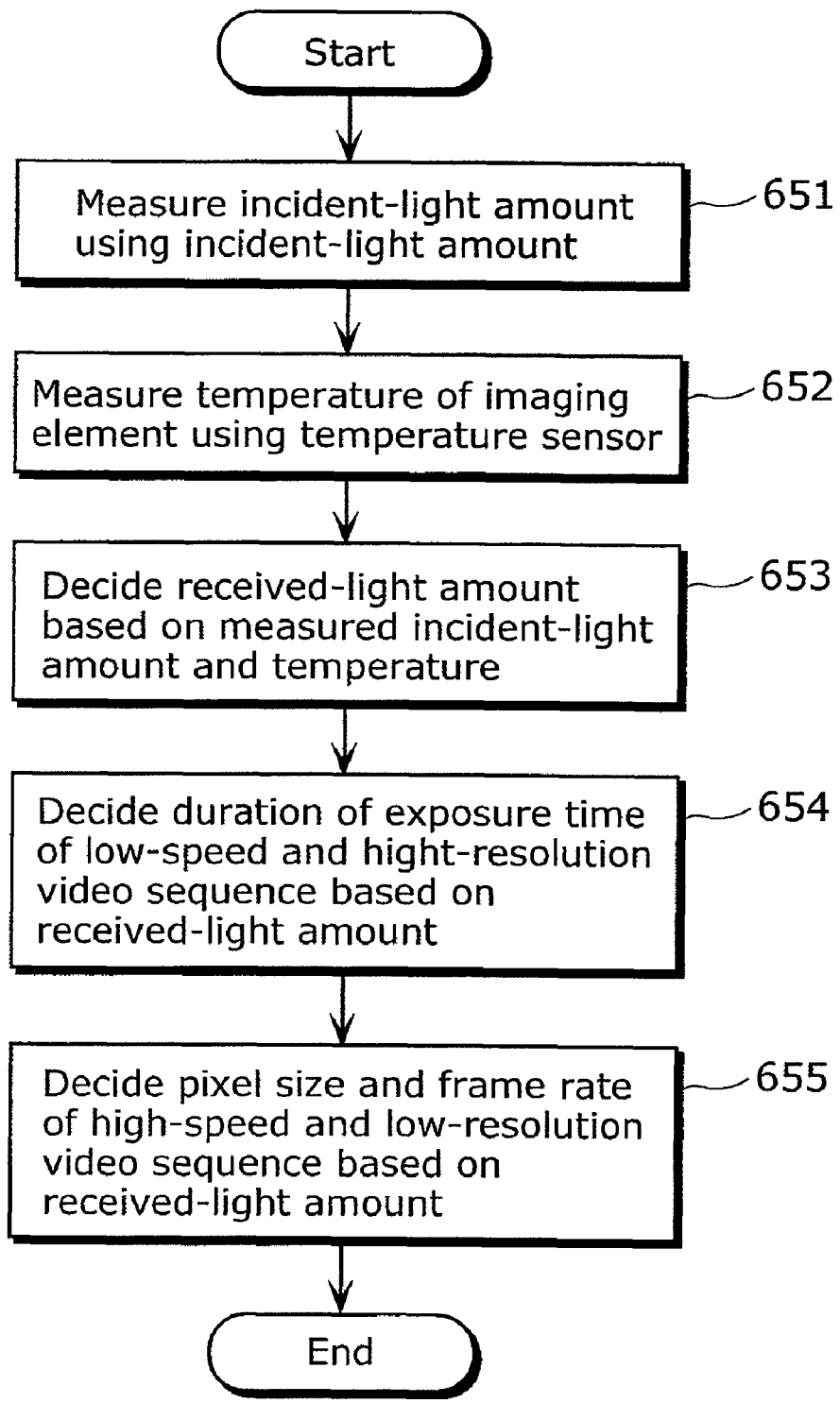
FIG. 5 is a flowchart which shows the operations of a received-light amount decision unit.

Next, the processes executed by the image generation apparatus 30 structured as mentioned above will be described below. FIG. 5 is a flowchart of the processes executed by the image generation apparatus 30. FIG. 4 is a flowchart of the processes executed by the image generation apparatus 30.

In Step 600, in the received-light amount decision unit 105, the capture condition decision unit 105c decides capture conditions (a duration of an exposure period, a frame rate, a pixel size) under which images received by the image receiving unit need to be captured, based on (i) an incident-light amount measured by the incident-light amount sensor 105 and (ii) a temperature of the light-receiving elements which is measured by the temperature sensor 105. Here, the capture conditions are used to set a predetermined external model constraint (relationships between (i) pixel values of a target high-speed and high-resolution video sequence and (ii) pixel values of the high-speed and low-resolution video sequence and the low-speed and high-resolution video sequence) which is described further below.

FIG. 5 is a flowchart of detail of Step 600 performed by the received-light amount decision unit 105.

In Step 651, the incident-light amount sensor measures an amount of light incident from the object (incident-light amount). The incident-light amount sensor may be formed apart from the imaging element, or may be formed as the imaging element. In Step 652, the temperature sensor measures a temperature of a light-receiving element in the image receiving unit.

In Step 653, a received-light amount required for each pixel in the imaging element is decided based on the measured light amount and temperature. Here, a desired S/N ratio is predetermined. A noise included in a captured image has components depending on the temperature of the imaging element and components included in the incident light itself. Since a noise depends on a temperature differently according to the imaging element, a relationship between a temperature and a noise is beforehand calculated. A noise intensity N can be decided from a temperature and an incident-light amount, and a signal intensity can be decided from an incident-light amount. As an incident-light amount is increased, a S/N ratio is improved. Therefore, based on a desired S/N ratio, a required received-light amount is decided. For example, assuming that a ratio of a signal intensity to a noise intensity is 100, if the noise intensity is 10 k, a required signal intensity is set to 1000.

In Step 654, capture conditions to satisfy a received-light amount required for the low-speed and high-resolution video sequence are determined. For the low-speed and high-resolution video sequence, a required received-light amount is obtained by changing a duration of an exposure period. A required duration of an exposure period can be calculated by dividing (i) the required received-light amount which is calculated in Step 651 by (ii) an incident-light amount per unit period which is calculated in Step 651.

In Step 655, capture conditions to satisfy a received-light amount required for the high-speed and low-resolution video sequence are determined. For the high-speed and low-resolution video sequence, the required received-light amount is obtained by changing a pixel size, namely, an area of the imaging element used to capture one pixel of the high-speed and low-resolution video sequence. A frame rate of the high-speed and low-resolution video sequence is set to be shorter than a duration of an exposure period of the low-speed and high-resolution video sequence. A duration of an exposure period of the high-speed and low-resolution video sequence is decided assuming that a frame interval (a temporal length or time interval of one frame) is maximum. A required pixel size is decided by dividing the required received-light amount by the set duration. A pixel size can be changed by electrically combining charge accumulation units in adjacent pixels in the imaging element, after photoelectric conversion, for example.

Note that it has been described with reference to the above flowchart that the required received-light amount is decided based on the temperature and the incident-light amount. However, it is also possible to decide the required received-light amount using only the incident-light amount, assuming that the temperature is an average temperature. Note also that it has been also described in the above example that a duration of an exposure period of the low-speed and high-resolution video sequence and a pixel size of the high-speed and low-resolution video sequence are decided based on respective required received-light amount. However, the advantages of the present invention can also be achieved also when one of the duration and the pixel size is fixed to an average value and the other one is set to be variable.

Note also that the received-light amount may be set to be greater than a required amount. However, in order to suppress the reduction of the temporal-spatial resolution due to a longer duration of an exposure period of an inputted image or an increase of a pixel size, and to efficiently improve a temporal-spatial resolution of a generated video sequence, it is desirable to set the received-light amount to be equal to the required amount. Note also that a duration of an exposure period or a pixel size may be set to be the same among all of the frame images. Or, a duration of an exposure period or a pixel size may be different for each frame or depending on a position in the image. In this case, an amount of incident light from the object is measured for each frame, or for each position in the image.

Referring back to the flowchart of FIG. 4, in Step 601, the high-speed image receiving unit 101*a* and the image receiving unit 101*b* accept inputs of a high-speed and low-resolution video sequence and a low-speed and high-resolution video sequence, respectively, which have been generated by capturing the same object under the above-described capture conditions. In the following description, a luminance image is used as an image.

Figure 6:
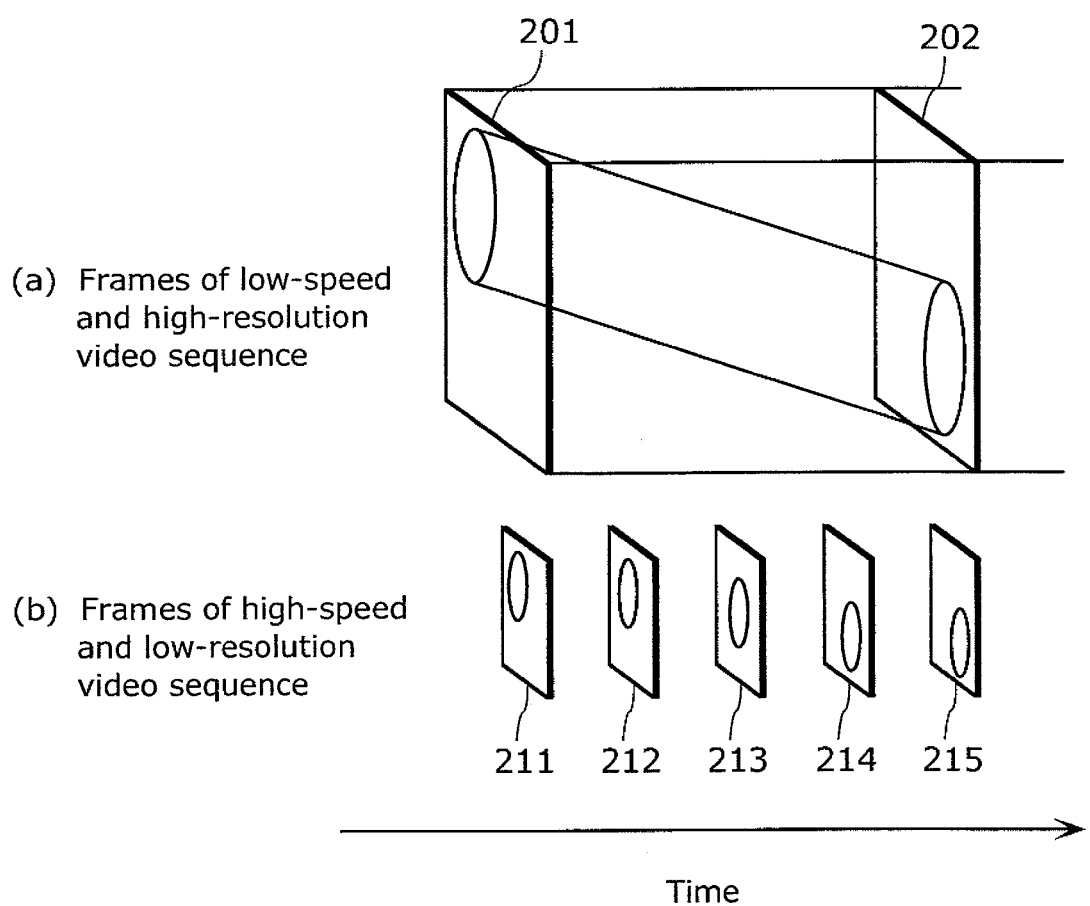
FIGS. 6 (*a*) and (*b*) shows an example of inputted images in time order.

FIGS. 6 (*a*) and (*b*) shows the relationship between a high-speed and low-resolution video sequence inputted to the high-speed image receiving unit 101*a* and a low-speed and high-resolution video sequence inputted to the low-speed image receiving unit 101*b*. In FIGS. 6 (*a*) and (*b*), the successive frame images in these two video sequences are arranged in time order. Frames 201 and 202 represent low-speed and high-resolution images, while frames 211 to 215 represent high-speed and low-resolution images.

In FIGS. 6 (*a*) and (*b*), a difference in a spatial resolution is expressed by a size of image. The frames 211 to 215 each has a smaller number of pixels and a less spatial resolution than those of the frames 201 and 202. On the other hand, as for the frame rate, the high-speed image receiving unit 101*a* captures images at a higher frame rate than the low-speed image receiving unit 101*b*. In this example, the high-speed image receiving unit 110*a* captures four frames while the low-speed image receiving unit 101*b* captures one frame. The time length between the frames 201 and 202 represents exposure period. The images inputted to the low-speed image receiving unit 101*b* are captured at a lower frame rate but can be exposed for a longer time than the images inputted to the high-speed image receiving unit 101*a*. In FIG. 6 (*a*), the frame 201 in the low-speed and high-resolution video sequence is exposed for a time period which is equivalent to a time period for capturing four frames in the high-speed and low-resolution video sequence of FIG. 6 (*b*).

The image of the frame inputted to the high-speed image receiving unit 101*a* and the image of the frame inputted to the low-speed image receiving unit 101*b* do not always need to be captured at the same time, if the relative relationship between these imaging timings is previously known (in other words, the phases at these imaging timings may be different from each other). In addition, longer exposure allows acquisition of motion information such as an afterimage of a moving object even in a high-resolution video sequence. It is possible to generate a video sequence with a high S/N ratio, a suppressed motion blur, and a high spatial and temporal resolution, by generating a video sequence which is consistent with motion information obtained from high-resolution images in an image integration process to be described later.

A specific example of the image capturing apparatus 10, namely, a photographing unit which captures two types of images will be shown below. These two types of images may be captured by arranging two types of cameras having different characteristics, using a half mirror, so that their angles of view become identical, as shown in FIG. 7 (*a*), or they may be captured by arranging two types of imaging elements having different characteristics within a camera, using a half mirror or a prism, so that their angles of view become identical, as shown in FIG. 7 (*b*), or they may be captured using an imaging element which captures simultaneously two types of images having different properties, as shown in FIG. 7 (c).

Next, a description will be given below, with reference to FIG. 8 (a) to (c), of the relationship between the pixel values (luminance values) of a target high-speed and high-resolution video sequence and the pixel values (luminance values) of a high-speed and low-resolution video sequence inputted to the high-speed image receiving unit 101a and a low-speed and high-resolution video sequence inputted to the low-speed image receiving unit 101b. This relationship is used for image generation as an external model constraint which should be satisfied by each pixel of the high-speed and high-resolution video sequence to be generated.

It is assumed here that the pixel values of each image are proportional to the amount of incident light when the image is captured, and the common proportional constant is used for all the pixel values. FIG. 8 (a) shows an arrangement of pixels of each frame in a target high-speed and high-resolution video sequence. For convenience of explanation, a part of the high-speed and high-resolution video sequence is extracted. FIG. 8 (a) shows an arrangement of pixels of each frame in a target high-speed and high-resolution video sequence. For convenience of explanation, a part of the high-speed and high-resolution video sequence is extracted. FIG. 8 (a) shows an arrangement of vertical three pixels (in the y-axis direction) and horizontal three pixels (in the x-axis direction) in four successive frames. The value of a pixel located at the pixel position (x, y, t) shall be HH(x, y, t). Here, x and y are the values within a range of 0, 1 and 2, while the value of t is within a range of 0, 1, 2 and 3.

Figure 8:
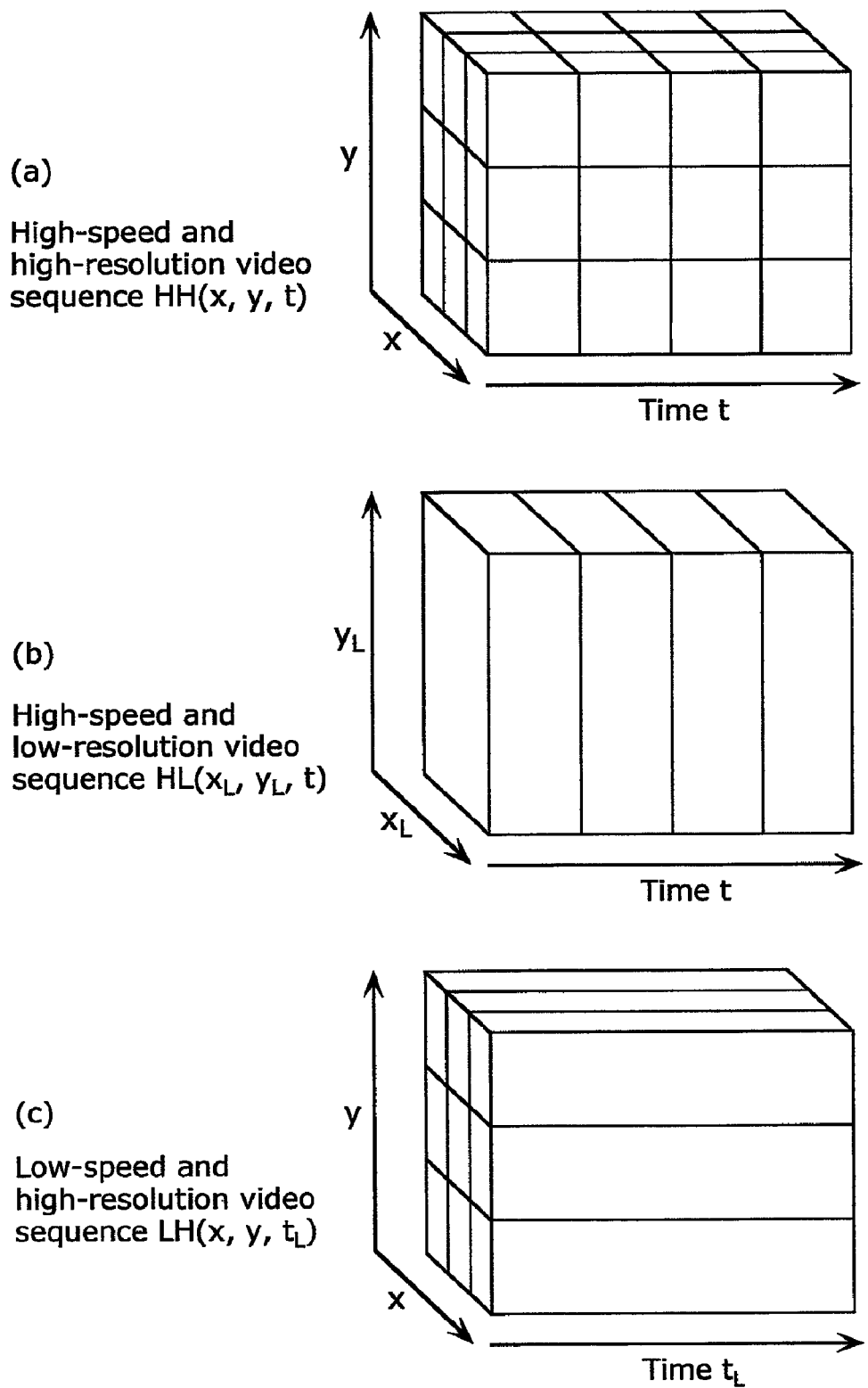
FIG. 8 (*a*) to (*c*) shows examples of pixel arrangements of a generated high-speed and high-resolution video sequence, an inputted high-speed and low-resolution video sequence, and an inputted low-speed and high-resolution video sequence, respectively.

Similarly, FIG. 8 (b) shows an arrangement of pixels in a high-speed and low-resolution video sequence captured at the same time and at the same angle of view as those of the high-speed and high-resolution video sequence shown in FIG. 8 (a). Here, the value of a pixel located at the pixel position ($x_L$, $y_L$, t) in the high-speed and low-resolution video sequence is represented as HL($x_L$, $y_L$, t). Since a low-resolution image and a high-resolution image are different in their numbers of pixels in the x direction and the y direction, the x and y coordinate values of the low-resolution image are respectively represented as $x_L$ and $y_L$ so as to be distinguished from those of the high-resolution image. In this example, an image area of nine pixels (three pixels in the x direction and three pixels in the y direction) in the high-resolution image is equivalent to an image area of one pixel in the low-resolution image, and the relationship of pixel values are represented by the following Equation 1. In other words, an image area of one pixel in the low-resolution image is equivalent to an image area of nine pixels in the high-resolution image, so that an amount of light which one pixel can receive is increased. A range of pixels which are actually combined is decided in Step 655.

$$HL(x_L, y_L, t) = \sum_{x=0}^{2} \sum_{y=0}^{2} HH(x, y, t) \quad \text{[Equation 1]}$$

Similarly, FIG. 8 (c) shows an arrangement of pixels of a low-speed and high-resolution video sequence captured at the same time and the same angle of view as those of the video sequence shown in FIG. 8 (a). Here, the pixel value of a pixel located at the pixel position (x, Y, $t_L$) in the low-speed and high-resolution video sequence is represented as LH(x, Y, $t_L$).

Since a low-resolution image and a high-resolution image are different in their numbers of frames in the time direction, the frame number of the low-speed image is represented as $t_L$ so as to be distinguished from that of the high-resolution image. In this example, a time interval of four frames in the high-speed image is equivalent to a time interval of one frame in the low-speed image, and the relationship of the pixel values are represented by the following Equation 2. In other words, one frame of the low-speed image is equivalent to four frames of the high-speed image, so that an amount of light which one pixel can receive is increased. An actual duration of an exposure period is decided in Step 654.

$$LH(x, y, t_L) = \sum_{t=0}^{3} G(t) * HH(x, y, t) \quad \text{[Equation 2]}$$

Here, G(t) represents an image capturing intensity at a time t, and indicates a scaling factor of a pixel value which changes according to the temporal change in the sensitivity of an imaging element and the aperture used for image capture. When there is no temporal change in the sensitivity of the imaging element and the aperture used for image capture, G(t) is 1.0.

Note that in the above example, the time t is represented in a discrete manner, but the relational expression as the following Equation 3 is used when the change in images are associated with temporally continuous change. It is possible to represent the process of deterioration in temporally continuous sequence of inputs by substituting $HH_{cont}$(x, y, $t_{cont}$) in Equation 3 for HH(x, y, t) in Equations 1 and 2.

$$LH(x, y, t) = \int_{t}^{t+\Delta t} \text{Exp}(t_{cont}) \cdot HH_{cont}(x, y, t_{cont}) dt_{cont} \quad \text{[Equation 3]}$$

In Equation 3, $\Delta t$ indicates a virtual exposure period of a frame image of a high-speed and high-resolution video sequence to be generated, $t_{cont}$ indicates a continuous time, $HH_{cont}$(x, y, $t_{cont}$) indicates temporally successive sequence of images, and $\text{Exp}(t_{cont})$ indicates a change in the virtual exposure period of the frame image of the high-speed and high-resolution video sequence.

As shown in FIGS. 6 (a) and (b), when a duration of an exposure period for the low-speed image is set to longer than a duration of an exposure period for the high-speed image, a received-light amount is increased. Thereby, an image with relatively suppressed noise can be captured. As a result, it is possible to generate a high-speed and high-resolution video sequence with a high S/N ratio and suppressed motion blur. In addition, it is also possible to increase a received-light amount even in the case of a low-resolution image having a large pixel size. As a result, it is possible to generate a high-speed and high-resolution video sequence with a high S/N ratio and suppressed motion blur.

The above description has been given, taking, as an example, the case where pixel values are proportional to an amount of incident light (FIG. 9 (a)). However, in the case where they are not proportional because of γ correction or the like (FIG. 9 (b)) and the case where the proportional constant varies from pixel to pixel, it is possible to modify the pixel values so that they have the common proportional constant to the incident light so as to satisfy Equations 1 and 2. This is done by inversely associating the pixel values with the input-output characteristics (input-output relationship) of an imaging element determined by capturing separately provided images. For example, by modifying the pixel values obtained as shown in FIG. 9 (b) using the correspondence between the pixel values and the modified values as shown in FIG. 9 (c), it is possible to process the modified pixel values in the same manner as the pixel values obtained as shown in FIG. 9 (a).

The above description has been given using luminance values as pixel values. However, even if each pixel has the values of colors R, G and B, the same relationship as the luminance values can be obtained for respective values of R, G and B.

Other external model constraints include continuity and smoothness between the values of spatially and temporally adjacent pixels. When the continuity of pixel values is used, the sum of squares Qs of the differences in luminance values of adjacent pixels in a high-speed and high-resolution video sequence is considered as shown in the following Equation 4.

$$Qs = \lambda s(x, y, t) \cdot \begin{bmatrix} \sum_{x=1}^{x_{max}} \left\{ \begin{array}{c} HH(x, y, t) - \\ HH(x-1, y, t) \end{array} \right\}^2 + \\ \sum_{y=1}^{y_{max}} \left\{ \begin{array}{c} HH(x, y, t) - \\ HH(x, y-1, t) \end{array} \right\}^2 + \\ \sum_{t=1}^{t_{max}} \left\{ \begin{array}{c} HH(x, y, t) - \\ HH(x, y, t-1) \end{array} \right\}^2 \end{bmatrix}$$ [Equation 4]

When the smoothness of pixel values is used, the sum of squares Qs of the second order differences in luminance values of adjacent pixels in a high-speed and high-resolution video sequence is considered as shown in the following Equation 5.

$$Qs = \lambda s(x, y, t) \cdot \begin{bmatrix} \sum_{x=1}^{x_{max}-1} \left\{ \begin{array}{c} 2 \cdot HH(x, y, t) - \\ HH(x+1, y, t) - \\ HH(x-1, y, t) \end{array} \right\}^2 \\ \sum_{y=1}^{y_{max}-1} \left\{ \begin{array}{c} 2 \cdot HH(x, y, t) - \\ HH(x, y+1, t) - \\ HH(x, y-1, t) \end{array} \right\}^2 \\ \sum_{t=1}^{t_{max}-1} \left\{ \begin{array}{c} 2 \cdot HH(x, y, t) - \\ HH(x, y, t+1) - \\ HH(x, y, t-1) \end{array} \right\}^2 \end{bmatrix}$$ [Equation 5]

In Equations 4 and 5, $x_{max}$, $y_{max}$ and $t_{max}$ indicate an x-direction pixel number, a y-direction pixel number and a maximum frame number, respectively. $\lambda s(x, y, t)$ is a coefficient for specifying the spatial and temporal distribution of constraints, and is determined using a motion confidence level in Step 604 to be described later.

As mentioned above, an external model constraint can be represented as an evaluation function for a high-speed and high-resolution video sequence to be generated. A decrease in the value of the evaluation function (evaluation value) is equivalent to an addition of the above-mentioned external model constraint to the high-speed and high-resolution video sequence.

Spatially and temporally continuity of edges can be used as one of the other external model constraints. For example, a constraint, as shown by the following Equation 6, that a change in the direction of an edge is small between the corresponding positions in temporally adjacent frames can be used.

$$Qte = \lambda te(x, y, t) \cdot \sum_{x=0}^{x_{max}} \sum_{y=0}^{y_{max}} \sum_{t=0}^{t_{max}} \sum_{i=0}^{i_{max}} \left\{ edge\begin{pmatrix} x + u(x, y, t), \\ y + v(x, y, t), \\ t+1, i \end{pmatrix} - edge(x, y, t, i) \right\}^2$$ [Equation 6]

A constraint, as shown by the following Equation 7, that edges facing the same direction exist in a spatially successive manner can be used $$Qse = \lambda se(x, y, t) \cdot \sum_{x=0}^{x_{max}} \sum_{y=0}^{y_{max}} \sum_{t=0}^{t_{max}} \sum_{i=0}^{i_{max}} \left\{ edge\begin{pmatrix} x + i_x, \\ y + i_y, \\ t, i \end{pmatrix} - edge(x, y, t, i) \right\}^2$$ [Equation 7]

In Equations 6 and 7, edge(x, y, t, i) indicates the strength of an edge of the i-th direction located at the position (x, y, t) in a video sequence. "i" indicates the type of an edge direction and has an integral value within a range from 0 to $i_{max}$. (ix, iy) in Equation 7 indicates a vector representing the direction indicated by the i-th edge direction.

u(x, y, t) and v(x, y, t) indicate an x-direction component and a y-direction component of a motion vector at the position (x, y, t) in an image. Edge detection can be achieved using the output from an edge detection filter such as a Gabor filter having direction dependence or using an edge direction which is discretized, when necessary, after the edge direction and strength are obtained by an differential operation as shown in the following Equation 8.

$$\left( \frac{\partial HH(x, y, t)}{\partial x}, \frac{\partial HH(x, y, t)}{\partial y} \right)$$ [Equation 8]

Equation 8 represents the edge direction and strength at the coordinate (x, y, t) of a high-speed and high-resolution video sequence HH, as a two-dimensional vector. The direction of the vector corresponds to the edge direction, and the magnitude of the vector corresponds to the edge strength.

In Equation 8, as with $\lambda s(x, y, t)$, $\lambda te(x, y, t)$ and $\lambda se(x, y, t)$ are also coefficients for specifying the spatial and temporal distribution of a constraint, and are determined using a motion confidence level in Step 604 to be described later.

As one of the other constraints, a limitation to principal components in a group of video sequences, which predetermine acceptable limits of images which can be represented by a video sequence to be generated, may be performed. For example, assuming that the luminance value HH(x, y, t) of each pixel in each frame of a video sequence is an independent element and the video sequence is a single data point, principal component analysis is performed on a group of video sequences each having the same predetermined number of frames and predetermined number of pixels, so as to generate a video sequence using the principal components preferentially. In this case, when the vector of a non-principal component is NPC(x, y, t), the inner product of the non-principal component (NPC) and a video sequence HH(x, y, t) to be generated is a constraint. This constraint Qpc is represented by the following Equation 9.

$$Qpc = \lambda pc(x, y, t) \cdot \sum_{x=0}^{x_{max}} \sum_{y=0}^{y_{max}} \sum_{t=0}^{t_{max}} NPC(x, y, t) \cdot HH(x, y, t) \qquad \text{[Equation 9]}$$

NPC is not limited to only one. A plurality of NPCs may be used, or the type of NPCs may be switched depending on an inputted image. In this case, the relationship between the inputted image and the principal component of a high-resolution image is previously learned and an NPC is selected using this learning result.

For example, three different types of groups of high-speed and high-resolution video sequences 1, 2 and 3 are prepared for learning. Vectors of non-principal components NPC1, NPC2 and NPC3 are obtained respectively from these groups of video sequences. Separately from the vectors, high-speed and low-resolution video sequences HL1, HL2 and HL3 and high-speed and high-resolution video sequences HH1, HH2 and HH3) are obtained respectively from the above groups of video sequences 1, 2 and 3 using Equations 1 and 2.

The relationship to be learned here is the correspondences between the three types of non-principal components NPC1, NPC2 and NPC3 and the three groups of video sequences: video sequences HL1 and HH1; video sequences HL2 and HH2; and video sequences HL3 and HH3. These correspondences may be learned using an arbitrary method. For example, a pair of average images of a high-speed and low-resolution video sequence HL and a high-speed and high-resolution video sequence HH is obtained for each group of video sequences and the correspondence between the pair of average images and the type of the non-principal component is retained (learning).

The difference between each pair of average images and a pair of new inputted video sequences HL and HH is obtained, and the non-principal component corresponding to the pair of average images having the smallest difference is used for the processing for reconstructing the inputted video sequences.

A method other than retention of the relationship between the average images and the type of non-principal components may be used. For example, it is acceptable to obtain in advance the input-output relationship using a learning method such as a neural network where the input is a pair of a high-speed and low-resolution video sequence HL and a high-speed and high-resolution video sequence HH and the output is the types of non-principal components corresponding to these HL and HH; to input the pair of input video sequences HL and HH to the neural network after the learning; and to use, as a constraint, the non-principal component of the type obtained as the output from the neural network.

In Equation 9, as with $\lambda s(x, y, t)$, $\lambda pc(x, y, t)$ is also a coefficient for specifying the spatial and temporal distribution of a constraint, and is determined using a motion confidence level in Step 604 to be described later.

Next, in Step 602, the motion estimation unit 103 calculates a motion and the confidence level of the motion from a high-speed and low-resolution video sequence. Here, the motion distribution calculation unit 103a obtains the direction and magnitude of the motion of an object (motion estimation) at each position in each frame of a video sequence received from the high-speed image receiving unit 101a, so as to calculate the spatial and temporal distribution of the directions and magnitudes of the motions.

The motion confidence level distribution calculation unit 103b calculates the spatial and temporal distribution conf(x, y, t) of the confidence levels of motion estimation. In this case, the confidence level of motion estimation indicates that the certainty of a motion estimation result increases as the confidence level increases and that the lower confidence level implies an error in the motion estimation result.

A motion between the corresponding positions in images of adjacent two frames can be obtained by, for example, a method used in P. ANANDAN, "A Computational Framework and an Algorithm for the Measurement of Visual Motion", IJCV, 2, 283-310 (1989) (Non-Patent Reference 1), a motion estimation technique generally used for video coding, and a feature point tracking technique used for tracking a moving object in an image sequence.

It is also acceptable to perform motion estimation for each of a plurality of areas using a common technique of global motion (such as affine motion) estimation across the image, a technique shown in Lihi Zelkik-Manor, "Multi-body Segmentation: Revisiting Motion consistency", ECCV (2002) (Non-Patent Reference 2), or the like, so as to determine the motion as a motion at each pixel position.

A confidence level can be calculated by a method described in the above document written by the Non-Patent Reference 1. In the case of motion estimation using block matching, it is acceptable to use, as a confidence level, the value obtained by subtracting the sum of squares of differences in pixel values between blocks corresponding to each other through a motion from the maximum possible value $SSD_{max}$ of the sum of squares, as shown in Equation 10, namely, Conf(x, y, t) which is the negative value of the sum of squares of differences in pixel values between the blocks.

Either when global motion estimation in an image is used or when local motion estimation in each area of an image is used, it is acceptable to use, as a confidence level, the value Conf(x, y, t) obtained by subtracting the sum of squares of differences in respective pixel values between an area adjacent to the starting point of a motion and an area adjacent to the ending point of the motion, from the maximum possible value $SSD_{max}$ of the sum of squares.

$$Conf(x, y, t) = SSD_{max} - \sum_{i \subset block} \sum_{j \subset block} \left\{ \begin{array}{l} I(x+i, y+j, t) - \\ I(x'+i, y'+j, t+1) \end{array} \right\}^2 \qquad \text{[Equation 10]}$$

In Equation 10, the position (x', y', t+1) is a pixel position which is equivalent to the destination of a motion from the pixel position (x, y, t) obtained as a result of motion estimation. In Equation 10, $\Sigma$ indicates an addition within a block area to be used for block matching.

Note that although in the above description, motion estimation and confidence level calculation are performed using images obtained from the high-speed image receiving unit 101a, such motion estimation and confidence level calculation may be performed using images obtained from the low-speed image receiving unit 101b.

Information from a sensor (a signal inputted to the sensor signal receiving unit 103c which detects a change in attitude of a photographing device may be used as an input. In this case, if the image capturing apparatus 10 includes an acceleration sensor and an angular acceleration sensor and the sensor signal receiving unit 103c obtains the speed and angular speed as an integration value of the acceleration, the motion distribution calculation unit 103a can obtain, based on the information inputted to the sensor signal receiving unit 103c, information of motion across the entire image produced by a change in the camera attitude such as motion blur.

For example, when a camera including vertical and horizontal angular acceleration sensors is used as the image receiving unit 101, it is possible to obtain, based on the outputs from the sensors, vertical and horizontal accelerations as a measured value of the attitude at each time. By integrating the acceleration values over time, it is possible to calculate an angular speed at each time.

When a camera has a horizontal angular speed ωh and a vertical angular speed ωv at a time t, the angular speed of the camera can be uniquely associated with the two-dimensional motion (u, v) of the object image originating from the camera direction, at the time t and at the position (x, y) on an imaging element (a captured image). The correspondence between the angular speed of the camera and the motion of the object image can be generally determined based on the characteristics (such as a focal length and lens distortion) of the optical system (such as a lens) in the camera, as well as the arrangement and the pixel pitch of the imaging element.

The actual value of the correspondence can be calculated geometrically and optically from the characteristics of the optical system, the arrangement and the pixel pitch of the imaging element, or by referring to the speed (u, v) of the object image on the imaging element (x, y) obtained from the angular speeds ωh and ωh in the correspondences previously held as a table.

Motion information obtained using such a sensor can be used together with the result of motion estimation obtained from an image. In this case, the motion distribution calculation unit 103a uses the information from the sensor mainly for motion estimation across the image, while using the result of motion estimation obtained from the image mainly for motion of an object in the image.

Next, in Step 603, the motion constraint specification unit 104c specifies the relationship between the result of motion estimation obtained by the motion estimation unit 103 and the target high-speed and high-resolution video sequence. The relationship between the result of motion estimation obtained from low-resolution images and a high-speed and high-resolution video sequence is described with reference to FIGS. 10 (a) and (b).

In FIG. 10, (a) and (b) respectively show high-speed frame images (frame numbers t and t+1) which are adjacent to each other. For ease of explanation, an area of three pixels by three pixels in a low-resolution image will be described as an example. Here, each pixel of a high-resolution image area is obtained by dividing a pixel of a low-resolution image area into nine (3×3) pieces. FIGS. 10 (a) and (b) shows only the pixels of the high-resolution image, which is necessary for explanation.

It is assumed here that, as a result of motion estimation performed by the motion estimation unit 103, the position of a low-resolution image pixel enclosed by a thick line 501 in FIG. 10 (a) corresponds to the pixel position 502 in FIG. 10 (b) (i.e., the image area 501 moves to the image area 502). Using the above-mentioned motion estimation technique, it is generally possible to calculate the direction and magnitude of motion on the basis of a smaller unit than a pixel.

Therefore, it is possible to calculate a motion of each pixel of a high-resolution image which differs in position from the position of a low-resolution image pixel, as shown in FIG. 10 (b), so as to obtain the relationship as shown in the following Equation 11.

The following relationship is obtained for the value of each pixel within the areas 501 and 502 in an image of a high-speed and high-resolution video sequence, using this result of motion estimation.

$$HH(x,y,t)=HH(x+u(x,y,t),y+v(x,y,t),t+1)$$ [Equation 11]

The above relationship is assumed to be obtained.

Here, u(x, y, t) and v(x, y, t) represent the results of motion estimation. Specifically, u(x, y, t) and v(x, y, t) indicate an amount of motion in the x direction and an amount of motion in the y direction, respectively, in the motion from the position (x, y, t) within the area 501 in FIG. 10 (a) to the area 502 in FIG. 10 (b). In the above example, motion estimation is performed on a high-speed and low-resolution video sequence, but motion estimation can be performed on a low-speed and high-resolution video sequence so as to use the result thereof. When a high-resolution video sequence is used, the time interval between the frames increases. However, the positional accuracy in associating pixels between frames to be used for motion estimation improves.

Next, in Step 604, the constraint control unit 104b determines the spatial and temporal distribution of the strength of a constraint, and the constraint specification unit 104e specifies an overall constraint to be imposed on a high-speed and high-resolution video sequence to be generated. This is described in more detail below.

More specifically, the constraint specification unit 104e specifies an overall constraint J(HH) to a target high-speed and high-resolution video sequence, using the respective relationships, as shown in Equations 1 and 2, between an image in a high-speed and high-resolution video sequence and a high-speed image and a low-speed image; the relationship, as shown in Equation 11, between the result of motion estimation and a high-speed and high-resolution video sequence; and the external model constraints as shown in Equations 4, 5, 6, 7, 9 and others. The following Equation 12 shows an example of an overall constraint J.

$$J=|HL-HL'|^2+|LH-LH'|^2+Qs+Qm+Qse+Qte+Qpc$$ [Equation 12]

In Equation 12, the first term of the right side is a constraint indicating the difference (the sum of squares of the differences between the corresponding pixels) between a high-speed and low-resolution video sequence HL' created from a high-speed and high-resolution video sequence using Equation 1 and a high-speed and low-resolution video sequence HL which is actually inputted to the high-speed image receiving unit 101a. The second term is a constraint indicating the difference (the sum of squares of the differences between the corresponding pixels) between a low-speed and high-resolution video sequence LH' created from a high-speed and high-resolution video sequence and a low-speed and high-resolution video sequence LH which is actually inputted to the low-speed image receiving unit 101b. The constraint in the first term and the constraint in the second term are used so that the relationship of luminance values between a generated image and a captured image satisfies the relationships shown in Equations 1 and 2 as much as possible. In other words, these constraints are the conditions for avoiding inconsistency in luminance values between the generated image and the captured image as much as possible.

The third term of the right side of Equation 12 represents an external model constraint Qs. When the constraints shown in Equations 4 and 5 are used, this constraint Qs helps spatially and temporally adjacent pixels in a generated image have similar luminance values. Therefore, this constraint suppresses generation of an image of which luminance values spatially and temporally change little by little like noise. The fourth term of the right side of Equation 12 represents a constraint Qm obtained based on a motion estimation result.

The following Equation 13 shows an example of a constraint obtained based on a motion estimation result so as to help to avoid inconsistency between the motion estimation result and a generated image.

$$Q_m = \sum_{x=0}^{x_{max}-1} \sum_{y=0}^{y_{max}-1} \sum_{t=0}^{t_{max}-1} \lambda_m(x, y, t) \cdot \left\{ HH\begin{pmatrix} x+u(x, y, t), \\ y+v(x, y, t), t+1 \end{pmatrix} - HH(x, y, t) \right\}^2$$ [Equation 13]

In Equation 13, a constraint is created using the motions u and v between adjacent frames t and t+1 in a high-speed and high-resolution video sequence. However, a constraint may be created using a motion estimation results u' and v' between frames separated from each other by one or more frames, as shown in the following Equation 14. Both the constraints shown in Equations 13 and 14 may be used.

$$Q_m = \sum_{x=0}^{x_{max}-2} \sum_{y=0}^{y_{max}-2} \sum_{t=0}^{t_{max}-2} \lambda_m(x, y, t) \cdot \left\{ HH\begin{pmatrix} x+u'(x, y, t), \\ y+v'(x, y, t), t+2 \end{pmatrix} - HH(x, y, t) \right\}^2$$ [Equation 14]

Using motion estimation performed in different frame intervals, it is possible to estimate a motion which is hard to estimate in a small number of frame intervals, such as a slow motion, and to reflect the estimated motion to image generation.

The fifth term of the right side of Equation 12 represents a constraint indicating temporal continuity of edges, the sixth term of the right hand of Equation 12 represents a constraint indicating spatial continuity of edges, and the seventh term of the right side of Equation 12 represents a constraint for suppressing non-principal components in a generated image.

Here, $\lambda s$, $\lambda m$, $\lambda se$, $\lambda te$ and $\lambda pc$ are coefficients for determining a spatial and temporal distribution of strengths of constraints, and are determined by the constraint control unit 104b. It is assumed that the confidence level of motion estimation calculated by the motion confidence level distribution calculation unit 103b in Step 602 is conf(x, y, t)(>0), and the confidence level of motion estimation increases as this value increases.

For example, $\lambda s$, $\lambda m$, $\lambda se$, $\lambda te$ and $\lambda pc$ are determined as follows: when conf(x, y, t)>α is satisfied where α is a predetermined constant, a motion constraint is imposed by setting, for example, $\lambda m(x, y, t)=1.0$, other constraints are set to small values ω(>1.0) which are predetermined on a coordinate (x, y, t), and when conf(x, y, t)<=α, $\lambda m(x, y, t)=0.0$ is set and other λ values are set to 1.0. More specifically, when the motion estimation unit 103 performs motion estimation on the basis of a block obtained by dividing each image in a video sequence, the confidence level of motion estimation conf(x, y, t) is calculated by subtracting the sum of squares of differences in pixel values between blocks from the maximum possible value of the sum of squares thereof. Using, as a high-confidence image area, a block having the difference greater than a predetermined value α, the image integration unit 104 generates a new image for the high-confidence image area using the motion estimation result. On the other hand, using, as a low-confidence image area, a block having the difference smaller than or equal to the predetermined value α, the image integration unit 104 generates a new image for the low-confidence image area using external model constraints.

λ may be determined in another manner. For example, it may be defined successively using a monotonically increasing function g(x), where $\lambda m(x, y, t)=g(conf(x, y, t))$ and the other λ values at the position (x, y, t) are g(conf_max)−g(conf(x, y, t)). Here, conf_max is the maximum possible value of the confidence level. As mentioned above, by placing importance on motion constraints when the confidence level of motion estimation is high while raising the proportion of external model constraints when the confidence level is low, it is possible to suppress image degradation and increase a spatial and temporal resolution even at the position where accurate motion estimation cannot be performed. In the above example, a plurality of constraints are used all together as external model constraints. However, another constraint may be further added, and even if only some of these constraints are used, the effect of the present invention can be obtained.

Next, in Step 605, the integration processing unit 104a obtains a high-speed and high-resolution video sequence which minimizes a constraint J. Such a high-speed and high-resolution video sequence which minimizes the constraint J can be obtained, for example, by solving the following Equation 15 where a value obtained by differentiating the constraint J by each pixel value of the high-speed and high-resolution video sequence is 0, or using an iteration method such as a maximum grading scale. Lastly, in Step 606, the integration processing unit 104a outputs the generated high-speed and high-resolution video sequence.

$$\frac{\partial J}{\partial HH(x, y, t)} = 0$$ [Equation 15]

A more specific example of a set of inputted images and outputted images will be described with reference to FIGS. 11 through 16.

For ease of explanation, an explanation is given using a video sequence including four frames, each consisting of six pixels by six pixels. These four frames can be considered as a part of a video sequence which is larger in size and frame number.

Figure 11:
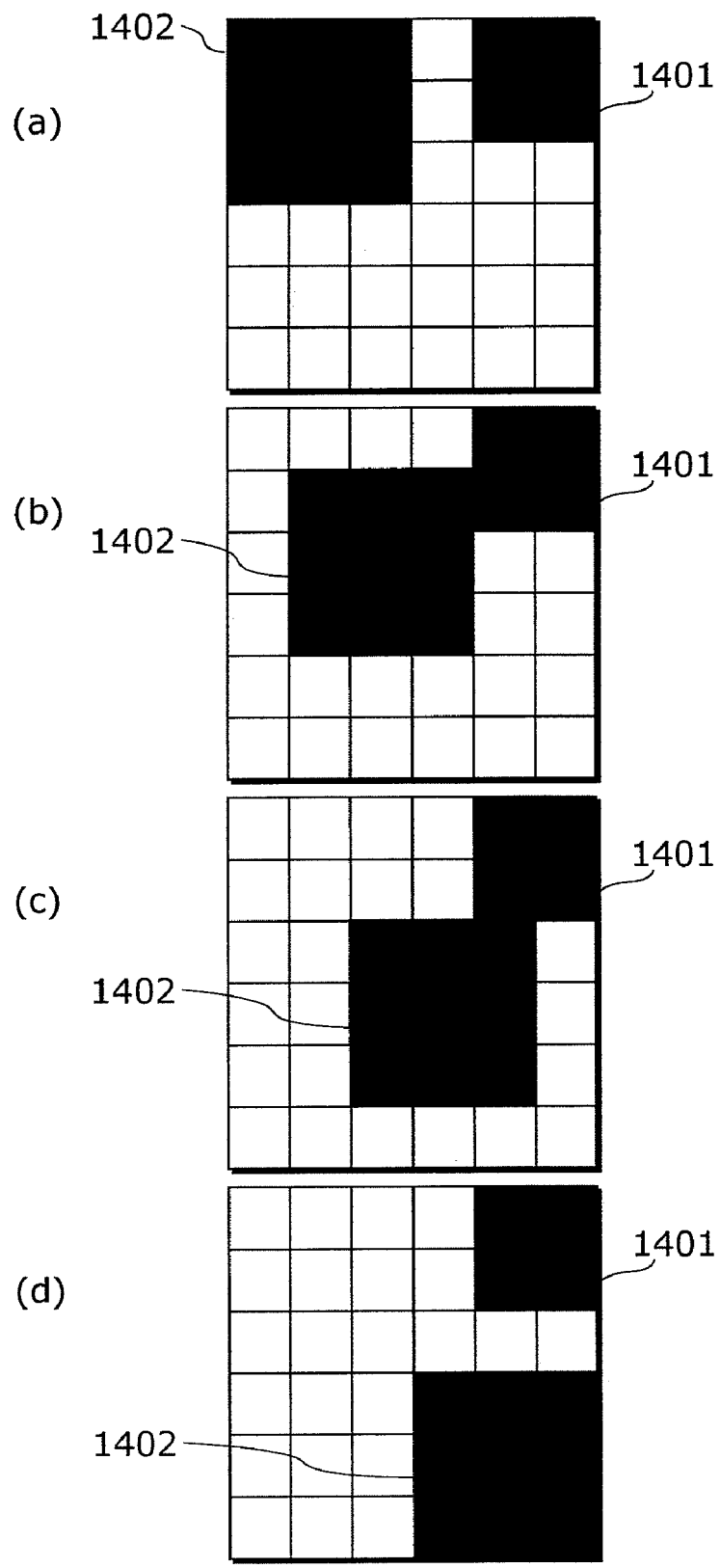
FIG. 11 (*a*) to (*d*) shows examples of frame images of a generated high-speed and high-resolution video sequence.

Here, FIG. 11 (a) to (d) shows images, assuming that a dark and moving object can be captured with a high S/N ratio, a high-speed, a high resolution. The images in FIG. 11 (a) to (d) cannot inherently be captured by photographing, but are shown just as example images for explanation. In FIG. 11, (a) through (d) show four frames placed in time order, in which a still object 1401 and a moving object 1402 are shown.

Figure 12:
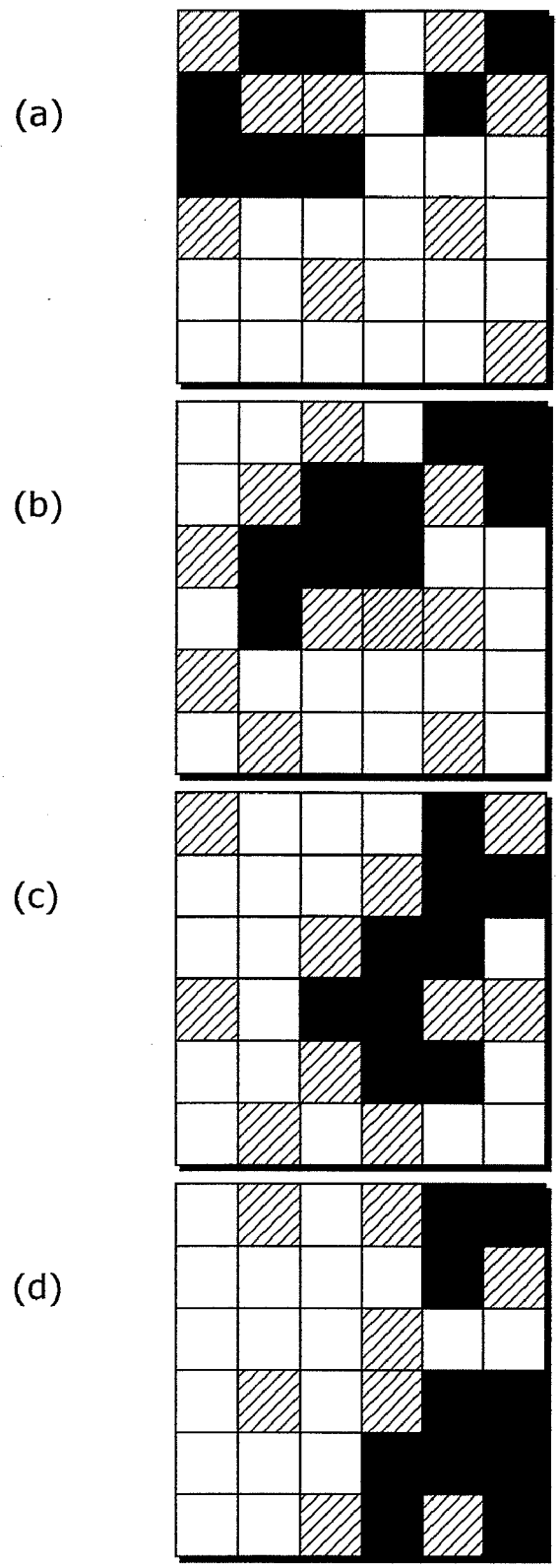
FIG. 12 (*a*) to (*d*) shows examples of frame images of a high-speed and high-resolution video sequence.

FIG. 12 (a) to (d) shows images in the case where such an object is captured at a high speed and a high resolution. Since the object is dark, images have relatively many noises (shaded grids in the figure). Occurrence locations of the noises are at random, and different among frames.

For these objects, a required received-light amount is decided based on an incident-light amount and a temperature of the imaging element, and constraints and capturing conditions for a high-speed and low-resolution video sequence and a low-speed and high-resolution video sequence are decided (Step 600). Next, a high-speed and low-resolution video sequence and a low-speed and high-resolution video sequence are captured (Step 601).

Figure 13:
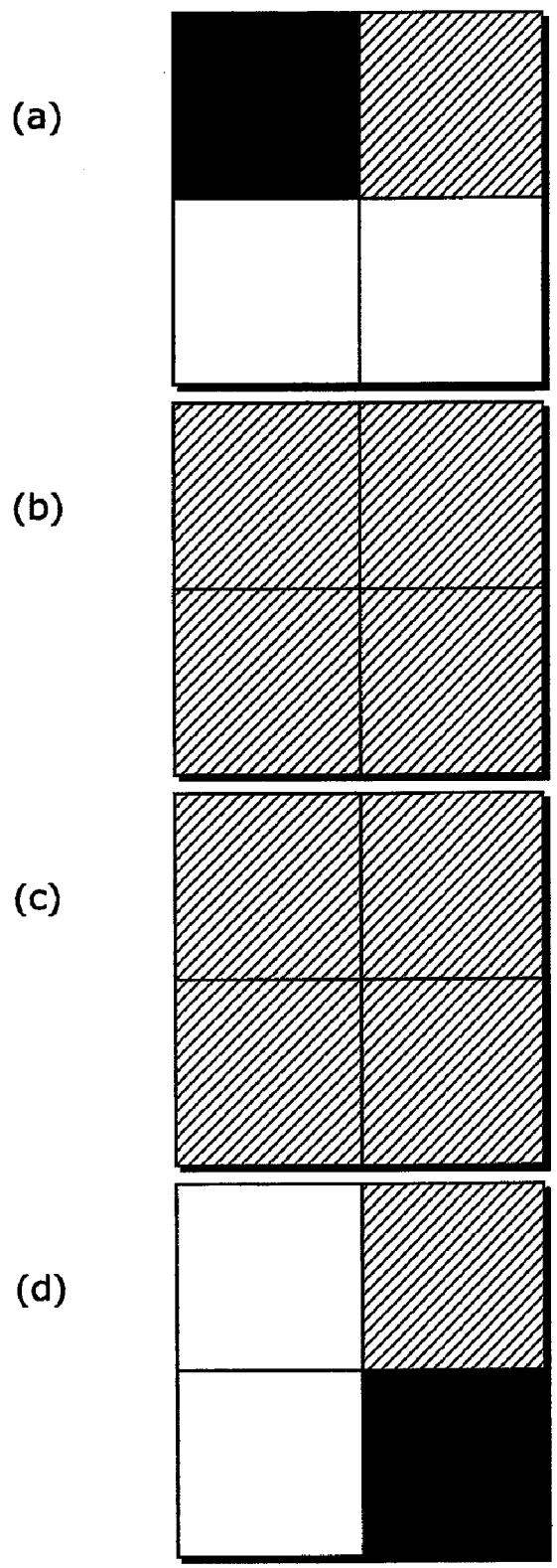
FIG. 13 (*a*) to (*d*) shows examples of frame images of an inputted high-speed and low-resolution video sequence.

FIG. 13 (a) to (d) shows example images of these objects in the high-speed and low-resolution video sequence (whose number of vertical and horizontal pixels is one third of that of the low-speed and high-resolution video sequence). In FIG. 13, (a) through (d) show frames corresponding to the frames shown in (a) to (d) of FIG. 11 in image capturing time. In these images, pixels having the intermediate values between black pixels and white pixels are shaded diagonally from upper right to left below. The number of frames is same as that in FIG. 11 (a) to (d), while the spatial resolution is lower than that in FIG. 11 (a) to (d). Moreover, since a received-light amount is increased resulting from a larger pixel size, noises are suppressed more than FIG. 12 (a) to (d).

Figure 14:
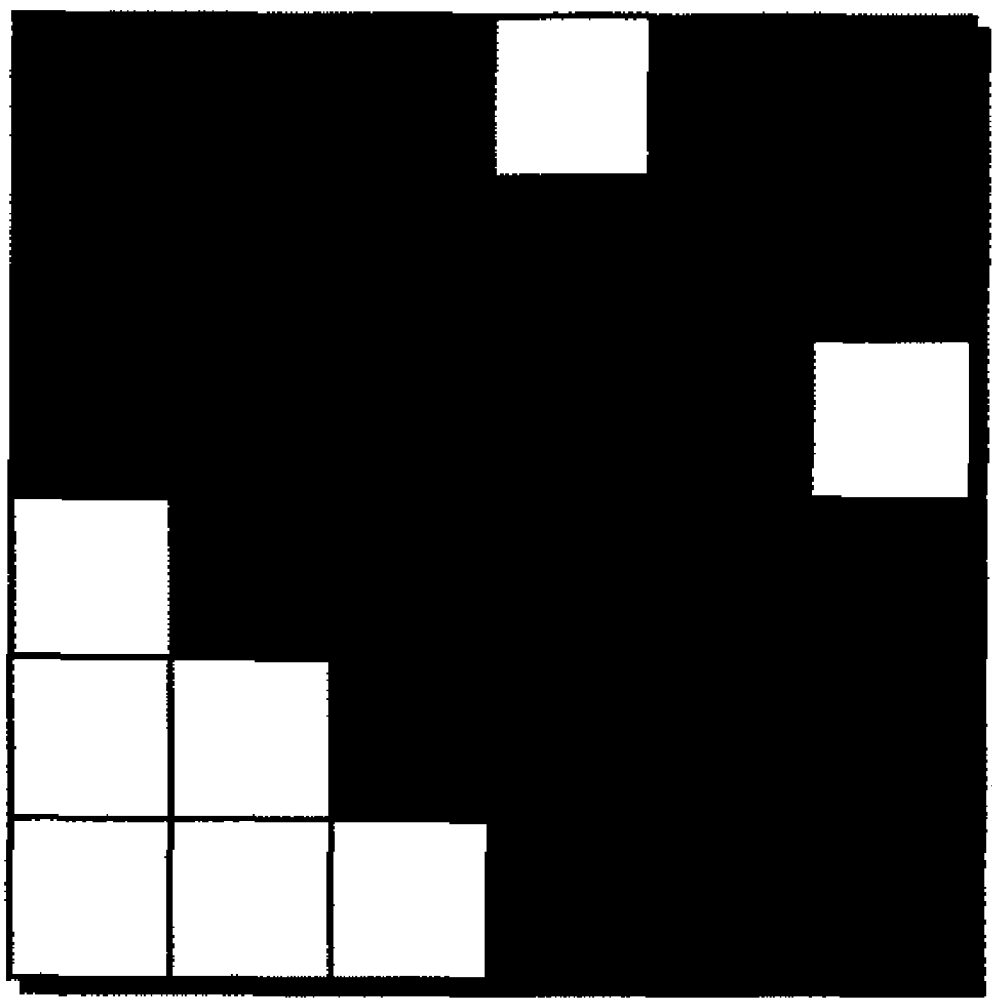
FIG. 14 is a diagram which shows an example of a frame image of an inputted low-speed and high-resolution video sequence.

Similarly, FIG. 14 shows an example image (of one frame) of these objects in the low-speed and high-resolution video sequence. The spatial resolution is the same as that in FIG. 11 (a) through (d), but the object 1402 is photographed as an afterimage because this image is exposed for a time period equivalent to the four frames shown in FIG. 11 (a) through (d). Since in the low-speed and high-resolution video sequence a received-light amount is increased resulting from a longer duration of an exposure period, noises are suppressed more than FIG. 12 (a) to (d).

Next, the motion estimation unit 103 obtains the motion of the object in the images and the confidence level of the motion from the high-speed and low-resolution video sequence (Step 602). Since the images in FIG. 11 (a) to (d) show a part of a larger image, it is also possible to obtain the result of motion estimation regarding the image areas shown in FIG. 11 (a) to (d) from the result of motion estimation performed across the larger image.

Figure 15:
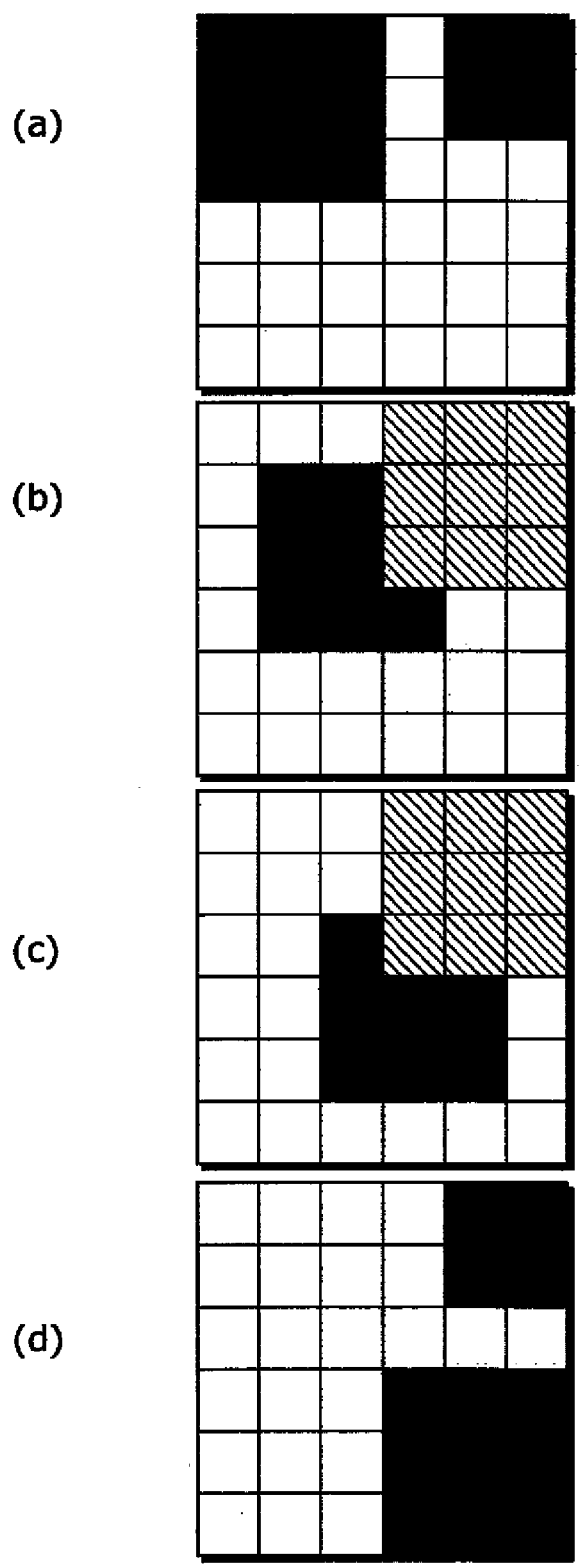
FIG. 15 (*a*) to (*d*) shows an example of distribution of confidence levels.

FIG. 15 shows an example of distributions of confidence levels. In FIG. 15, (a) to (d) show frames corresponding to the frames shown in (a) to (d) of FIG. 11 in image capturing time. In FIGS. 15 (b) and (c), areas of lower confidence levels of motion estimation are shaded diagonally from upper left to right below, while areas of higher confidence levels of motion estimation are shown as white or black areas. Here, both the black and white pixels represent the relationship with the objects, there is no difference in confidence level between them. The motion estimation results for the still object and the background are considered to have an amount of motion of 0.

In FIG. 11 (a) to (d), in the area where the two objects 1401 and 1402 get close to each other, accurate motion estimation is difficult. The constraint control unit 104b sets an overall constraint from the constraints which have been set using the motion estimation result in Step 603 and the external constraints for the area of a lower confidence level. Then the integration processing unit 104a generates a high-speed and high-resolution video sequence using the overall constraint and outputs the resulting video sequence (Steps 605 and 606).

Figure 16:
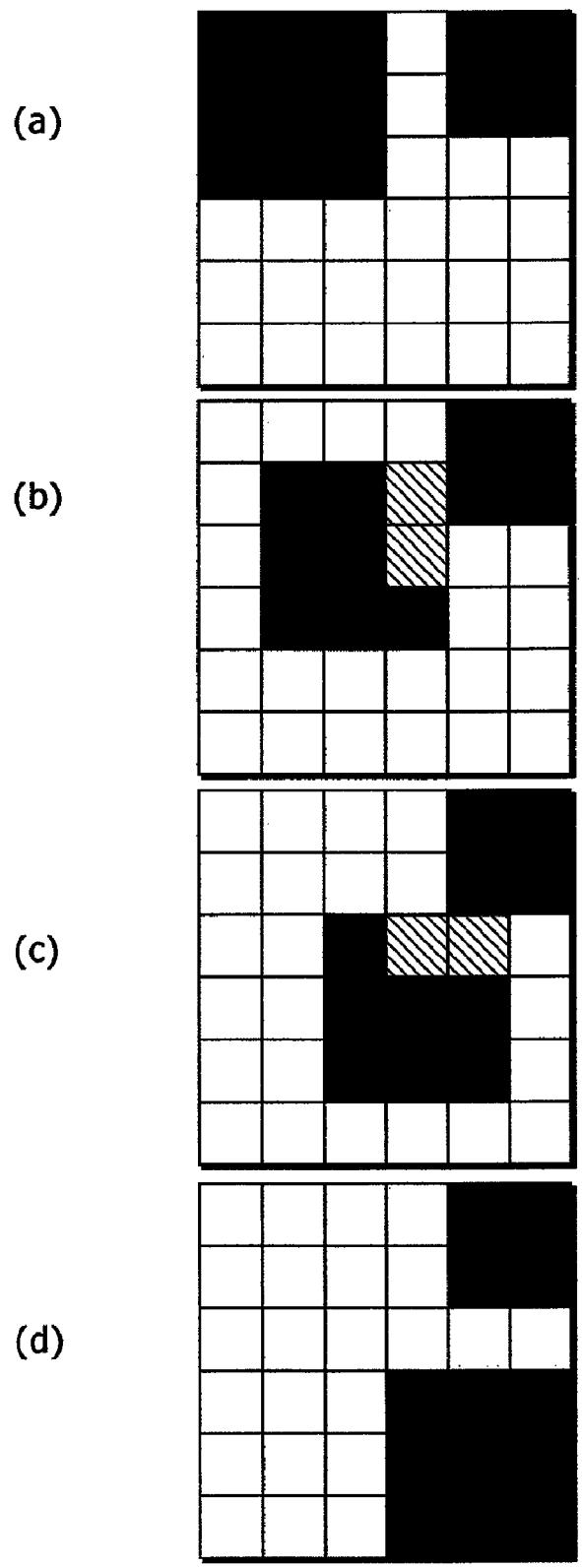
FIG. 16 (*a*) to (*d*) shows examples of frame images of a generated video sequence.

FIG. 16 shows an example of generated images. In FIG. 16, (a) through (d) show frames corresponding to the frames shown in (a) to (d) of FIG. 11 in image capturing time. By using the inputted images (FIG. 13 (a) to (d), FIG. 14) in which noise components are relatively suppressed resulting from the increased received-light amount, a high-speed and high-resolution video sequence which is different from FIG. 12 (a) to (d) is generated with suppressed noises and suppressed motion blur.

These images are similar to the images in FIG. 11 which cannot inherently be obtained by photographing, while frames (b) and (c) of FIG. 16, in which the two objects get close to each other, include the intermediate pixel values.

Figure 17:
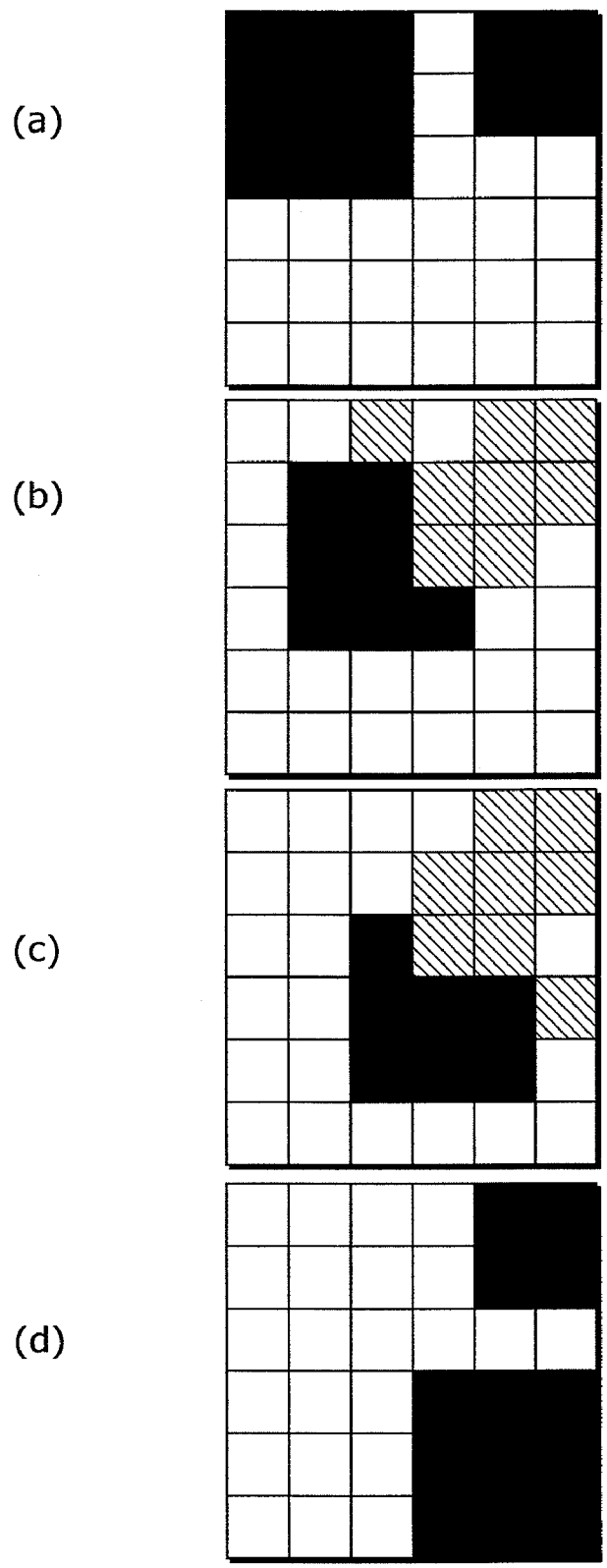
FIG. 17 (*a*) to (*d*) shows examples of frame images of a video sequence generated without using confidence levels.

In order to compare with FIG. 16, FIG. 17 (a) to (d) shows examples of generated images in the case where only a motion estimation result is used, but a motion confidence level and external constraints are not used. Accurate image generation cannot be performed in the upper right portions in the frames (b) and (c) in FIG. 17 where accurate motion estimation cannot be performed.

Being different from the results seen in FIGS. 17 (b) and (c), the results seen in FIGS. 16 (b) and (c) prove that the integration processing unit 104a can generate a desirable image as a high-speed and high-resolution image. This is realized in the following reasons. The motion estimation is not performed correctly in the upper right portions in the frames (b) and (c) in FIG. 15. Therefore, according to various external constraints, such as the continuity of pixel values between positions in a frame or between frames (Equations 4, 5 or the like), or the continuity of edges between them (Equations 6, 7 or the like) and the tendency of principal components of a video sequence (Equation 9) are used.

If low-speed and high-resolution images are captured in a long exposure period, as in the case of the present invention, it is possible to accumulate a sufficient amount of light in a light-receiving part of an imaging element for high-resolution images and thus obtain images on which thermal noise generated by the imaging element itself has a relatively low impact. By generating high-speed and high-resolution images using the above-mentioned images obtained by long-time exposure and the luminance and motion information obtained from high-speed and low-resolution images (since the light-receiving part for such low-resolution images can have a relatively large area compared with that for high-resolution images, it is less subject to the thermal noise), it is possible to achieve a special effect that less noisy images can be obtained even if an object is dark and moving.

In the above example, the image integration unit 104 only outputs generated images. However, it may output the confidence levels of the generated images in addition to the images themselves. A confidence level γ of a generated image is a value which predicts the degree to which a high-speed and high-resolution image is accurately generated. The value γ can be determined using the total sum of confidence levels of motions shown in the following Equation 16, the ratio N/M between the number of effective constraints N and the total number of pixels M (which is the number of frames multiplied by the number of pixels of each frame image) of a target video sequence, and so forth.

$$\gamma = \sum_{x=0}^{Xmax} \sum_{y=0}^{Ymax} \sum_{t=0}^{Tmax} conf(x, y, t) \quad \text{[Equation 16]}$$

where N=Nh+Nl+NλxC, Nh is the total number of pixels of high-speed images (the number of frames multiplied by the number of pixels of one frame image), Nl is the total number of pixels of low-speed images, NA is the total number of spatial and temporal positions (x, y, t) at which external constraints are to be imposed, and C is the number of types of the external constraints. Note that in the case where an equation like Equation 15 is solved as a linear simultaneous equation, the number of conditions indicating the stability of solution calculation, described in Cline, A. K., Moler, C. B., Stewart, G. W. and Wilkinson, J. H., "an Estimate for the Condition Number of a Matrix", SIAM J. Num. Anal. 16 (1979), 368-375 and the like, can be used as a confidence level. If a motion confidence level is high, it can be expected that the confidence level of a video sequence generated using a motion constraint is also high. Furthermore, when there are a lot of effective constraints for the total number of pixels of a video sequence to be generated, a video sequence as a solution can be generated stably, and thus the confidence level of the generated sequence is also expected to be high. Similarly, since it is expected that a small number of constraints leads to a smaller error between the solutions, the confidence level of the generated video sequence is also expected to be high.

Figure 18:
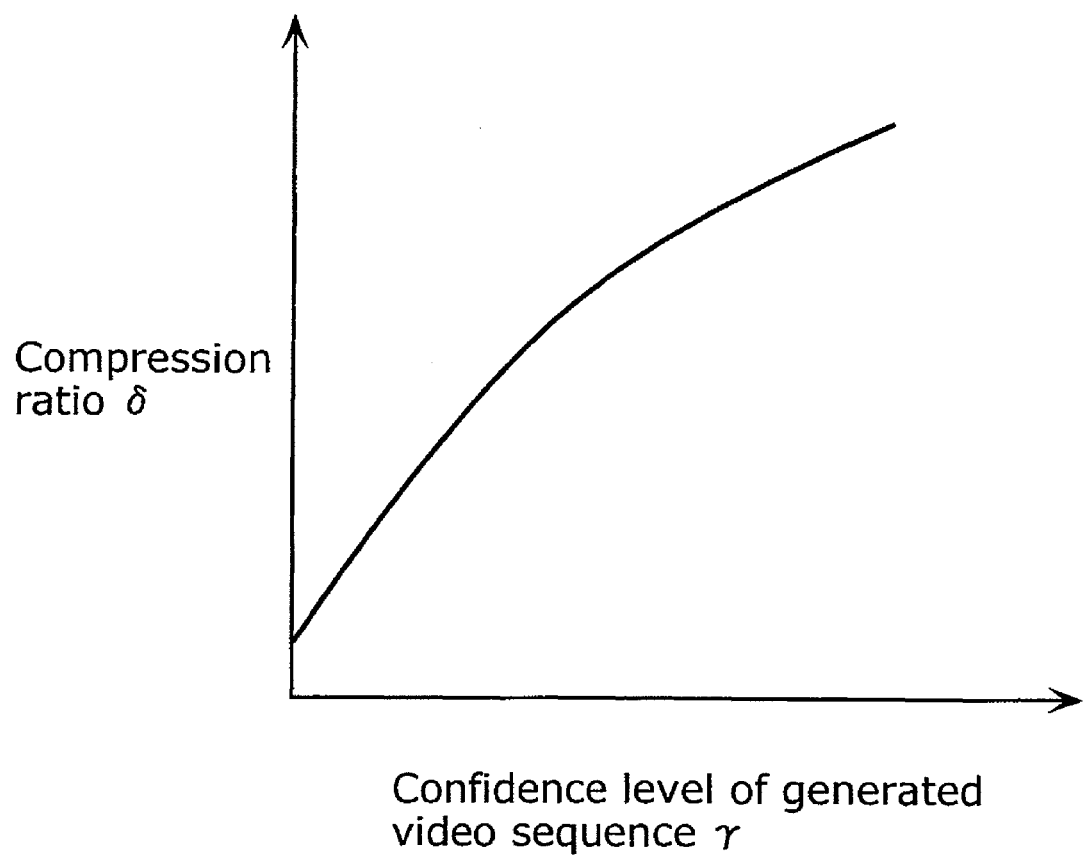
FIG. 18 is a graph which shows an example of the relationship between a confidence level and a compression ratio used when the compression ratio for coding an image is changed using the confidence level of a generated image.

By outputting the confidence level of a generated video sequence, it is possible to increase the compression ratio of the outputted video sequence to be coded and compressed according to MPEG when its confidence level is low, and to decrease the compression ratio thereof when its confidence level is high. Therefore, an appropriate compression ratio can be set. For example, a confidence level $\gamma$ of a generated video sequence and a compression ratio $\delta$ for coding the sequence are set in monotonically increasing relationship as shown in FIG. 18, and coding is performed at the compression ratio $\delta$ which corresponds to the value $\gamma$ of the confidence level of the generated video sequence. Since the generated video sequence may include a certain margin of error when its confidence level is low, it is expected that a substantial loss of information does not occur even at an increased compression ratio. Therefore, an effective reduction of data amount can be achieved. Here, a compression ratio is a ratio of an amount of coded image data with respect to an amount of original image data. The amount of coded data decreases and thus the quality of the decoded data decreases, as the compression ratio increases (i.e., as the compression ratio has a larger value).

Similarly, in an MPEG environment or the like, by setting a highly confident frame preferentially to be a frame to be intra-coded such as an I-picture and other frames to be frames to be inter-coded, it is possible to improve the quality of a reproduced video sequence when it is fast-forwarded or paused. For example, as for the above generated video sequence, the confidence level $\gamma(t)$ of each frame is calculated, where t is a frame time. In order to select a frame to be intra-coded from among successive frames, such a frame is selected from among frames having values $\gamma(t)$ larger than a predetermined threshold value $\gamma(t)$, or a frame having the largest value $\gamma(t)$ is selected from among frames of a predetermined section of successive frames.

Note that the effects of the present invention can be achieved, regardless of whether or not coding processing is performed on the outputted video sequence.

The above example has been explained on the assumption that a pixel value is a single luminance value. However, it is also possible to generate a high-speed and high-resolution video sequence from color images by performing the above processing for luminance values on each of R, G, B components of the color images. There is another method for handling color information more easily to achieve the same effects. In that method, a low-speed image is divided into luminance components and chrominance components. Then the above processing is performed only on the luminance components so as to generate a high-speed and high-resolution luminance image, and the chrominance components are interpolated to be expanded and added to the high-speed and high-resolution luminance image. In this case, the principal components of the image information are contained in the luminance information. Therefore, even if the chrominance information is interpolated to be expanded, it is possible to generate a higher-speed and higher-resolution video sequence than an inputted video sequence by combining the luminance information and chrominance information, and thus to reduce the processing amount compared with the separate processing of R, G, B components.

Figure 19:
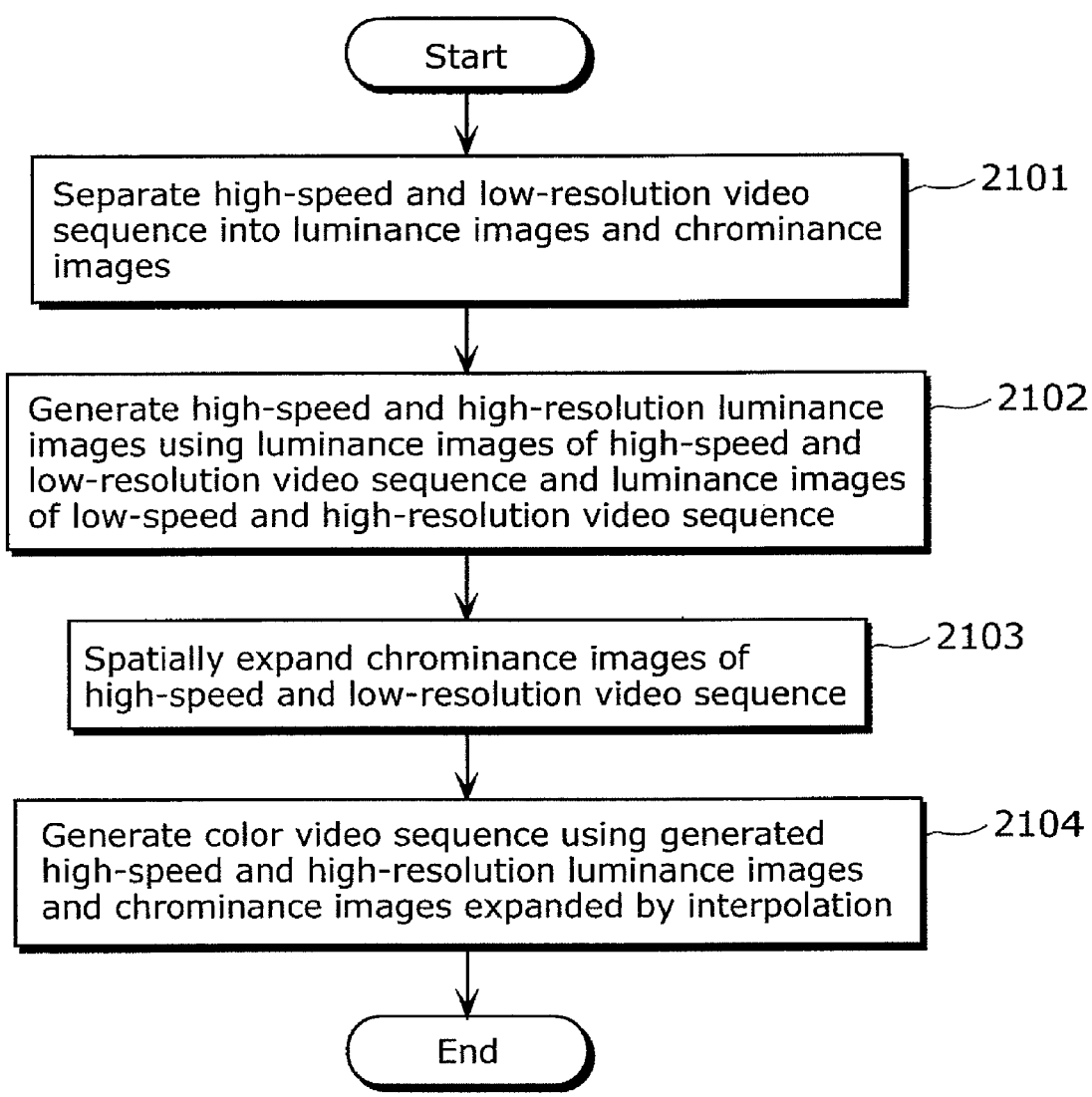
FIG. 19 is a flowchart which shows a sequence of processes for integrating color video sequences.

FIG. 19 shows the sequence of processes to be performed on color images. Images of a high-speed and low-resolution video sequence are divided into luminance images and chrominance images in Step 2101, and then in Step 2102, a high-speed and high-resolution video sequence is generated using these luminance images and the luminance images of a low-speed and high-resolution video sequence, according to the process sequence shown in FIG. 4. In Step 2103, the chrominance images are interpolated to be expanded so as to have the same number of pixels as the high-resolution images. In Step 2104, the generated luminance images and the interpolated and expanded chrominance images are synthesized so as to generate a high-speed and high-resolution color images. As described above, the image integration unit 104 extracts chrominance information from a high-speed and low-resolution video sequence, and generates a new intermediate video sequence from the luminance information of the high-speed and low-resolution video sequence as well as a low-speed and high-resolution video sequence. Then, the image integration unit 104 adds the chrominance information to the generated intermediate video sequence so as to generate a new final video sequence. Therefore, less processing is required for integrating images of a color video sequence.

As described above, according to the image generation system 100 according to the present embodiment, the constraint control unit 104b determines, according to the confidence level obtained by the motion estimation unit 103, the degree to which external model constraints and motion constraints are to be imposed, and high-speed images and low-speed images are integrated using the imposed constraints. Therefore, it is possible to obtain a high-speed and high-resolution video sequence even when motion estimation cannot be performed or the accuracy of motion estimation is low in the corresponding image area.

Note that the present embodiment describes an example where the entire processing is performed across the video sequence. However, it is acceptable to spatially and temporally divide a video sequence into regions and the same processing as mentioned above is performed on each region so as to generate partial high-speed and high-resolution video sequences, and then to spatially and temporally combine the generated partial video sequences to obtain a high-speed and high-resolution video sequence corresponding to the entire original video sequence. By spatially and temporally dividing a video sequence, it is possible to suppress the calculation processing and memory size required for processing a video sequence including a large number of pixels or frames. Particularly, by dividing a video sequence in the time direction, it is also possible to reduce temporal delay of image generation caused by processing previously inputted frames all at once.

When an image is divided into regions as mentioned above, respective regions may be set so that adjacent spatial and temporal regions overlap one another near the boundary between them.

Figure 20:
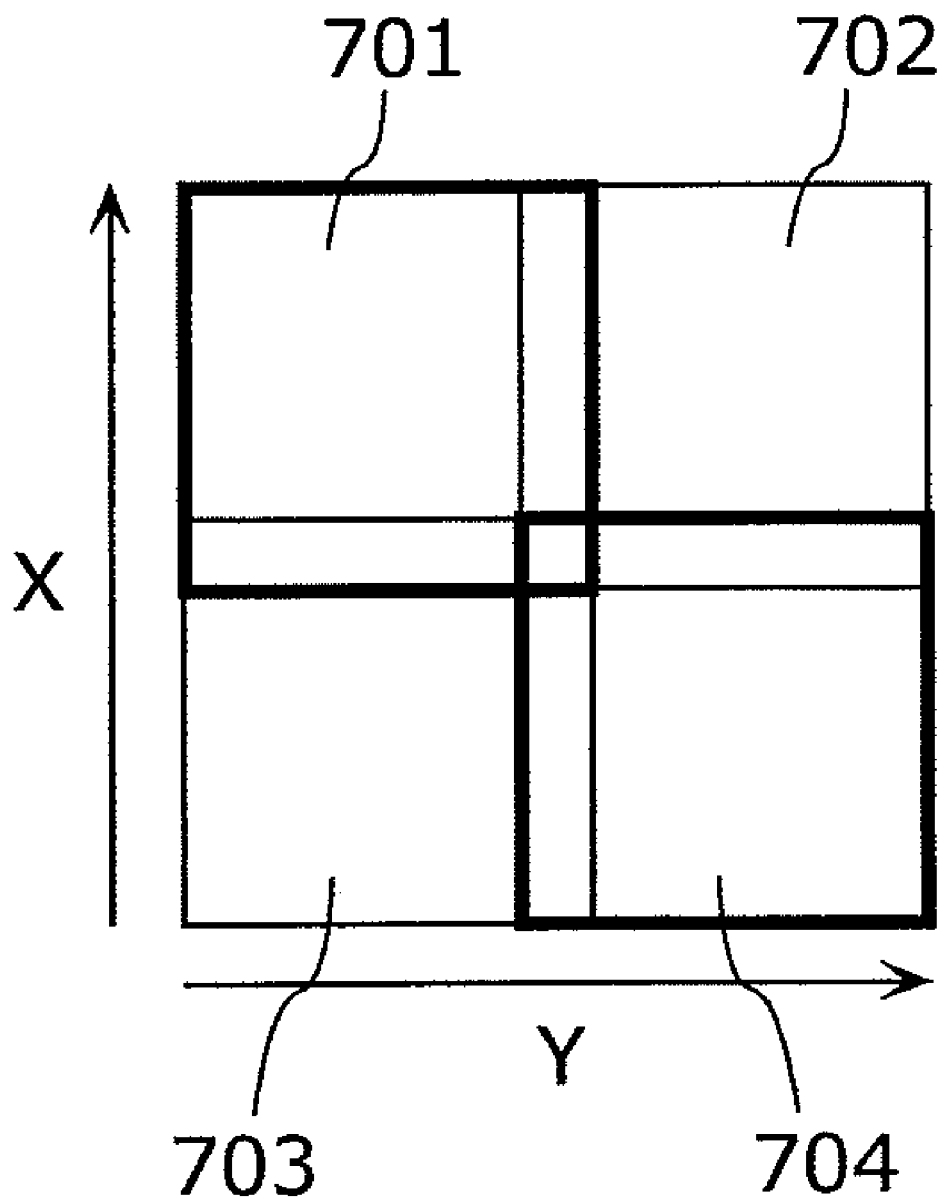
FIG. 20 is a diagram which shows an example of processing for dividing an image into regions.

FIG. 20 shows an example where an image is divided so that adjacent regions overlap one other spatially. In FIG. 20, an image is divided into regions 701 to 704 so that they spatially overlap one another. By generating a video sequence corresponding to each region and then performing weighted averaging on pixel values of each region which overlaps another region, these regions are combined seamlessly. An image may be divided into regions, as is the division shown in FIG. 20, so that adjacent regions overlap one another in the time direction.

Such overlapped parts allow suppression of discontinuity between adjacent regions created as division processing results.

Note that in such division processing for allowing regions to overlap one another, the size of the overlapped part is predetermined. The larger the size of the overlapped part is, the more enhanced the effect of reducing discontinuity in processing results between regions to be processed. The smaller the size of the overlapped part is, the more enhanced the effect of suppressing the increased calculation of the overlapped part.

When an image is divided into regions in the time direction, the boundary between adjacent regions may be set in the following manner. A change in an image between frames of a video sequence is previously calculated, and a temporal boundary is set for frames in which the change in the image is greater than a predetermined threshold. For example, a value SSD(t) as shown in the following Equation 17 is defined as a difference between adjacent frame images, and when SSD (t)> th is satisfied, the boundary is set between a frame of time t and a frame of time t+1. Then, the processing of the frames of time t and earlier ones of a sequence is performed separately from the processing of the frame of time t+1 and the following ones.

$$SSD(t) = \sum_{x=0}^{Xmax} \sum_{y=0}^{Ymax} \{I(x, y, t) - I(x, y, t+1)\}^2 \quad \text{[Equation 17]}$$

Here, $I(x, y, t)$ indicates the luminance at a position $(x, y)$ in a frame image of time t, and th indicates a predetermined threshold. A boundary for separating processing need not be determined based on the threshold th, but rather it may be determined to be a time t when the SSD(t) becomes maximum in a sequence in the time domain in which the processing should be separated. By doing so, it is expected that discontinuity in processing results between temporally adjacent regions is less likely to be perceived because the discontinuity becomes relatively small with respect to a change in an image between frames.

Note that the above example shows a generation of a video sequence having the same frame rate as that of a high-speed and low-resolution video sequence and the same number of pixels as that of a low-speed and high-resolution video sequence. However, it is also possible to generate a video sequence having a much higher frame rate than that of the high-speed and low-resolution image or a video sequence having a much greater number of pixels than that of the low-speed and high-resolution video sequence.

For example, the same processing can be performed using Equations 18 and 19 instead of Equations 1 and 2 in order to generate an image having a frame rate of n times as high as that of a high-speed and low-resolution image.

$$HL(x_L, y_L, t_{HL}) = \sum_{t=0}^{1} \sum_{x=0}^{2} \sum_{y=0}^{2} HH(x, y, t) \quad \text{[Equation 18]}$$

$$LH(x, y, t_L) = \sum_{t=0}^{7} G(t) \cdot HH(x, y, t) \quad \text{[Equation 19]}$$

Here, x, y and t represent the x and y coordinates and the frame number of an image to be generated, $t_L$ represents the frame number of a low-speed and high-resolution image, and xL, yL, tHL represent the x and y coordinates and the frame number of a high-speed and low-resolution image, respectively.

Equation 18 shows that HH images are added in the spatial direction (x-y direction) as is the case with Equation 1 and further two frames are also added in the time direction so as to obtain the pixel values of a high-speed and low-resolution video sequence. In Equation 19, the number of frames to be added is twice as many as that in Equation 2.

As for motion estimation, $u(x, y, t)$, $v(x, y, t)$ and $conf(x, y, t)$ are generated using the magnitudes of motions in the x and y directions $u(xL, yL, tHL)$ and $v(xL, yL, tHL)$, as well as the confidence level of the motion estimation $conf(xL, yL, tHL)$ obtained as a result of motion estimation of a high-speed and low-resolution images.

Here, $u(x, y, t)$, $v(x, y, t)$ and $conf(x, y, t)$ are respectively calculated by expanding, by spatial and temporal interpolation, $u(xL, yL, tHL)$, $v(xL, yL, tHL)$ and $conf(xL, yL, tHL)$ n times (for example, two times) in the time direction and m times (for example, three times) in the spatial direction.

Particularly when the values of $u(x, y, t)$ and $v(x, y, t)$ are represented by the number of pixels, these values may be calculated by multiplying, n times and m times respectively, the values obtained by expanding $u(x_L, y_L, t_{HL})$ and $v(x_L, y_L, t_{HL})$ by spatial and temporal interpolation. This is because: when a frame interval is 1/n times, the magnitude of motion also becomes 1/n times because an object moves at the same speed as the frame. Moreover, the value for representing the same magnitude of motion becomes m times because the number of pixels of one frame become m times in both x and y directions, respectively.

The same processing can be performed using Equations 20 and 21 instead of Equations 1 and 2 in order to generate an image having the number of pixels of n' times (for example, two times) as many as that of a low-speed and high-resolution image both vertically and horizontally.

$$HL(x_L, y_L, t) = \sum_{x=0}^{5} \sum_{y=0}^{5} HH(x, y, t) \quad \text{[Equation 20]}$$

$$HL(x_{LH}, y_{LH}, t_L) = \sum_{t=0}^{3} \left\{ \sum_{x=0}^{1} \sum_{y=0}^{1} \frac{G(t) \cdot}{HH(x, y, t)} \right\} \quad \text{[Equation 21]}$$

Here, x and y indicate x-y coordinates of a pixel of an image to be generated, xLH and yLH indicate x-y coordinates of a pixel of is a low-speed and high-resolution image, and xL and yL indicate x-y coordinates of a pixel of a high-speed and low-resolution image, respectively. In Equation 20, the numbers of pixels to be added in the x and y directions are respectively twice as many as those in Equation 1. Equation 21 shows that low-speed and high-resolution pixel values are obtained by adding pixels in the x and y directions in addition to the addition thereof in the time direction as shown in Equation 2.

As for motion estimation, $u(x, y, t)$, $v(x, y, t)$ and $conf(x, y, t)$ are generated using the magnitudes of motions in the x and y directions $u(xL, yL, t)$ and $v(xL, yL, t)$, as well as the confidence level of the motion estimation $conf(xL, yL, t)$ obtained as a result of motion estimation of a high-speed and low-resolution images.

Here, $conf(x, y, t)$, $u(x, y, t)$ and $v(x, y, t)$ are respectively calculated by expanding, by spatial interpolation, $conf(xL, yL, t)$, $u(xL, yL, t)$ and $v(xL, yL, t)$ in the spatial direction n'×m times.

Particularly when the values of u(x, y, t) and v(x, y, t) are represented by the number of pixels, these values may be calculated by multiplying, n times and m times respectively, the values obtained by expanding u(xL, yL, t) and v(xL, yL, t) by spatial and temporal interpolation. This is because the value for representing the same magnitude of motion becomes n'×m times because the number of pixels in the x and y directions are respectively n'×m times.

Furthermore, by combining the processing using the above-mentioned Equations 18 and 19 with the processing using Equations 20 and 21, it is easy to generate a video sequence having the same frame rate as that of a high-speed and low-resolution video sequence and the same number of pixels as that of a low-speed and high-resolution video sequence.

The image generation apparatus according to the present invention has been described based on the present embodiment, but the present invention is not limited to this embodiment The present invention also includes other embodiments obtained by adding variations conceived by those of ordinary skill in the art to the present embodiment.

For example, in Step 600 of the flowchart of FIG. 4, when the amount of light incident from the object measured by the light amount sensor 105a exceeds a light amount which allows to capture a low-speed and high-resolution video sequence in a shorter duration of an exposure period than a frame rate required for image, it is possible to increase a frame rate of the low-speed and high-resolution video sequence is increased in Step 655 of the flowchart of FIG. 5, thereby receive only the low-speed and high-resolution video sequence which has been captured in the shorter duration of the exposure period, and eventually generate a target high-speed and high-resolution video sequence.

In this case, the above-described processing is performed by setting the first term $|HL-HL'|^2$ in the overall constraint J in Equation 12 to 0. As a result, it is possible to generate a target high-speed and high-resolution video sequence.

Likewise, when the incident-light amount measured by the light amount sensor 105a exceeds a light amount which allows to capture a high-speed and low-resolution video sequence having a minimum pixel size, it is also possible to receive only the high-speed and low-resolution video sequence which has been captured with a minimum pixel size, and eventually generate a target high-speed and high-resolution video sequence.

In this case, the above-described processing is performed by setting the second term $|LH-LH'|^2$ in the overall constraint J in Equation 12 to 0. As a result, it is possible to generate a target high-speed and high-resolution video sequence. In the case of using the constraint J, the high-speed and high-resolution video sequence is generated by reducing a difference between (i) a value of each pixel in the high-speed and low-resolution video sequence and (ii) a sum of values of pixels in the high-speed and high-resolution video sequence which are located corresponding to the each pixel in the high-speed and low-resolution video sequence.

However, in the case of a small light amount, of course, and also in the case where the incident-light amount is enough to capture the low-speed and high-resolution video sequence in a short duration of an exposure period, or in the case where a high-speed and low-resolution video sequence can be captured with a minimum pixel size, it is possible to generate a target high-speed and low-resolution video sequence from both of the low-speed and high-resolution video sequence and the high-speed and low-resolution video sequence. In such cases, it is also possible to generate a high-speed and low-resolution video sequence, so that a total number of pixels of the video sequence per unit time period exceeds a total number of pixels of the inputted images per unit time period.

Therefore, especially when a processing speed for image inputting and recording is restricted in an imaging system, the image generation apparatus is useful to generated images having a high-resolution and high-frame rate, regardless of a light amount.

Note that, it is also possible to perform the processing of the flowcharts of FIGS. 4 and 5, after performing light amount adjustment using a mechanical diaphragm function thereby adjusting an excessive light amount or a depth of field in the same manner as general imaging system.

Note also that it has been described in the present embodiment that a target high-speed and high-resolution video sequence is generated when the integration processing unit 104 reduces a difference (the second term in the right side of Equation 12) between (i) a frame value of an inputted still image (one of frames included in a low-speed and high-resolution video sequence) and (ii) a sum of values of frames in the high-speed and high-resolution video sequence which correspond to an exposure period for the still image, according to the overall constraints J of Equation 12 specified by the constraint specification unit 104e.

Here, instead of the sum, it is also possible to use an average value which is calculated by multiplying the sum by a constant number, and which is information that is substantially equivalent to the sum. This means that in the present invention it is also possible to generate a target high-speed and high-resolution video sequence, by reducing a difference between (i) a frame value of the still image and (ii) an average of values of frames in the target high-speed and high-resolution video sequence which are corresponding to an exposure period for the still image.

A part or all of the image generation processing performed by the image generation apparatus according to the present invention may be performed by a dedicated device. Or, a computer terminal apparatus, a communication device placed in a base station or the like, or a CPU integrated in a standalone computer may execute an image generation processing program so as to perform the above-mentioned image generation processing.

Figure 21:
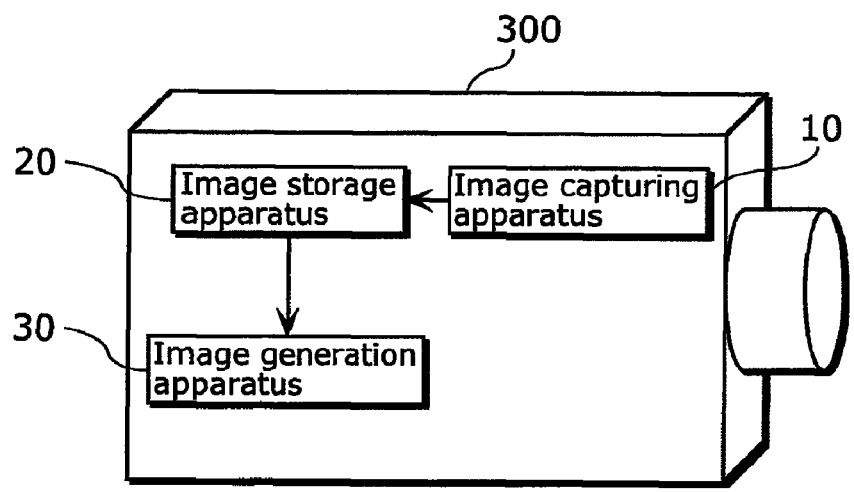
FIG. 21 is a block diagram which shows a specific example of an image generation system.

The present invention may be embodied as a camera 300 as shown in FIG. 21, namely as a standalone apparatus, using a structure including all the units of the image generation system 100 shown in FIG. 2 except for the display apparatus 40.

Furthermore, the present invention may be embodied as a camera with a video recording/playback function by adding the display apparatus 40 to the camera 300 shown in FIG. 21.

Figure 22:
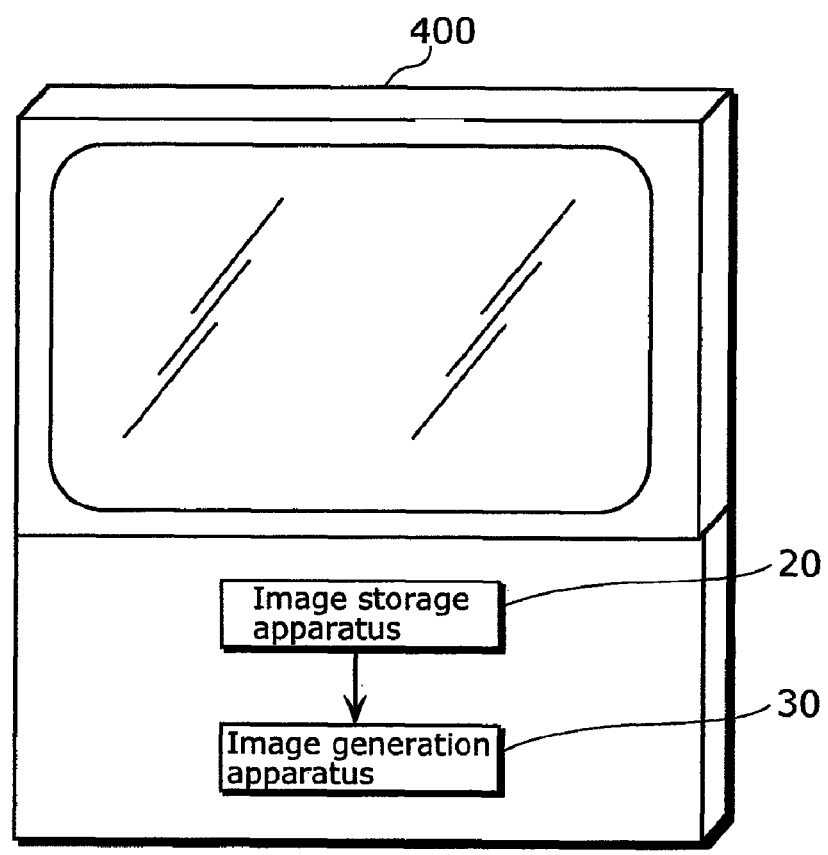
FIG. 22 is a block diagram which shows another specific example of the image generation system.

The present invention may also be embodied as a display device 400 as shown in FIG. 22, using a structure including all the units of the image generation system 100 shown in FIG. 2 but the image capturing apparatus 10. In this case, it is possible to display a previously recorded video sequence with an enhanced spatial and temporal resolution.

Note that the above-mentioned constituent units correspond to the elements defined in the claims as follows. To be more specific, examples of "the image receiving unit", "the motion estimation unit", "the external model constraint unit", "the image integration unit", and "the capture condition decision unit" in the claims correspond to the image receiving unit 101, the motion estimation unit 103, the external model constraint unit 104d, the image integration unit 104, and the received-light amount decision unit 105, respectively. These elements defined in the claims are not limited only to the constituent units of the above embodiments, but also include their equivalents.

INDUSTRIAL APPLICABILITY

The present invention can be used not only as an image generation apparatus which generates a new video sequence from a plurality of video sequences, particularly as an image generation apparatus which generates a high-speed and high-resolution video sequence from a high-speed and low-resolution video sequence and a low-speed and high-resolution video sequence, but also as a video device or system, a video synthesis apparatus, a video editing apparatus, an image reconstruction apparatus, an image reconstruction program, and the like, in which such an image generation apparatus is incorporated.

The invention claimed is:

1. An image generation apparatus that generates a new video sequence representing an object, from an original video sequence and a still image which are generated by capturing the object, said image generation apparatus comprising:
    an image receiving unit operable to receive the original video sequence and the still image; and
    an image integration unit operable to generate, from the original video sequence and the still image received by said image receiving unit, the new video sequence including frames having a resolution which is equal to or higher than a resolution of the still image, at a frame rate which is equal to or higher than a frame rate of the original video sequence, by reducing a difference between (i) a value of the still image and (ii) a sum of values of the frames in the new video sequence which correspond to an exposure period for the still image,
    wherein the original video sequence includes frames having a resolution which is lower than the resolution of the still image and a frame interval which is shorter than the exposure period for the still image.

2. The image generation apparatus according to claim 1, further comprising
    a capture condition decision unit operable to (i) measure an amount of light incident from the object, and (ii) decide, based on the amount of the light, at least one of (ii-1) a capture condition under which the original video sequence is to be captured and (ii-2) a capture condition under which the still image is to be captured,
    wherein said image receiving unit is operable to receive the original video sequence and the still image which are generated by capturing the object, under the at least one of the capture conditions decided by said capture condition decision unit, and
    said capture condition decision unit is operable
    to decide a larger area in an imaging element as an area to be used to capture one pixel of the original video sequence, as the amount of the light measured by said capture condition decision unit is smaller; or
    to decide a longer duration of an exposure period as a duration in which the still image is to be captured, as the amount of the light measured by said capture condition decision unit is smaller.

3. The image generation apparatus according to claim 2, wherein said capture condition decision unit is operable to further measure a temperature, and
    to decide a larger area in the imaging element as the area to be used to capture one pixel of the original video sequence, as the temperature measured by said capture condition decision unit is higher, or
    to decide a longer duration of the exposure period as a duration in which the still image is to be captured, as the temperature measured by said capture condition decision unit is higher.

4. The image generation apparatus according to claim 2, further comprising
    a constraint unit operable to specify a constraint to be satisfied by pixel values of the new video sequence to be generated, based on continuity between pixel values of spatially and temporally adjacent pixels,
    wherein said image integration unit is operable to generate the new video sequence in which the constraint specified by said constraint unit is satisfied.

5. The image generation apparatus according to claim 2, further comprising:
    a motion estimation unit operable to estimate a motion of the object from the original video sequence which is received by said image receiving unit; and
    a constraint unit operable to specify a constraint to be satisfied by pixel values of the new video sequence to be generated, based on the motion estimated by said motion estimation unit,
    wherein said image integration unit is operable to generate the new video sequence in which the constraint specified by said constraint unit is satisfied.

6. The image generation apparatus according to claim 2, wherein the still image is a frame in another video sequence, the another video sequence having a frame rate which is lower than the frame rate of the original video sequence and a resolution which is higher than the resolution of the original video sequence.

7. The image generation apparatus according to claim 1, wherein said image receiving unit is operable to receive only one of the original video sequence and the still image, when an amount of light incident from the object exceeds a predetermined threshold value, and
    said image integration unit is, when said image receiving unit receives only the original video sequence, operable to generate the new video sequence from the original video sequence, by reducing a difference between (i) a value of each pixel in the original video sequence and (ii) a sum of values of pixels in the new video sequence which are located corresponding to the each pixel in the original video sequence.

8. An image generation method of generating a new video sequence representing an object, from an original video sequence and a still image which are generated by capturing the object, the still image having a resolution higher than a resolution of each frame in the original video sequence, said image generation method comprising steps of:
    (i) measuring an amount of light incident from the object, and (ii) deciding, based on the amount of the light, at least one of (ii-1) a capture condition under which the original video sequence is to be captured and (ii-2) a capture condition under which the still image is to be captured;
    receiving the original video sequence and the still image which are generated by capturing the object, under the at least one of the capture conditions decided in said deciding; and
    generating, from the original video sequence and the still image received in said receiving, the new video sequence including frames having a resolution which is equal to or higher than a resolution of the still image, at a frame rate which is equal to or higher than a frame rate of the original video sequence, by reducing a difference between (i) a value of the still image and (ii) a sum of values of the frames in the new video sequence which correspond to an exposure period for the still image, wherein said deciding includes:

deciding a larger area in an imaging element as an area to be used to capture one pixel of the original video sequence, as the amount of the light measured in said measuring is smaller; or deciding a longer duration of an exposure period as a duration in which the still image is to be captured, as the amount of the light measured in said measuring is smaller, the duration being longer than a frame interval of the original video sequence.

9. A non-transitory computer-readable recording medium having a program stored thereon for generating a new video sequence representing an object, from an original video sequence and a still image which are generated by capturing the object, the still image having a resolution higher than a resolution of each frame in the original video sequence, said program causing a computer to execute:

the steps included in the image generation method according to claim 8.

* * * * *